United States Patent
Jung et al.

(10) Patent No.: US 12,382,260 B2
(45) Date of Patent: Aug. 5, 2025

(54) METHOD FOR PERFORMING REINFORCEMENT LEARNING BY V2X COMMUNICATION DEVICE IN AUTONOMOUS DRIVING SYSTEM

(71) Applicant: LG ELECTRONICS INC., Seoul (KR)

(72) Inventors: Ikjoo Jung, Seoul (KR); Sangrim Lee, Seoul (KR); JaYeong Kim, Seoul (KR); Yeongjun Kim, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 18/025,977

(22) PCT Filed: Sep. 15, 2020

(86) PCT No.: PCT/KR2020/012430
§ 371 (c)(1),
(2) Date: Mar. 13, 2023

(87) PCT Pub. No.: WO2022/059808
PCT Pub. Date: Mar. 24, 2022

(65) Prior Publication Data
US 2024/0031786 A1    Jan. 25, 2024

(51) Int. Cl.
*H04W 4/40* (2018.01)
*H04W 56/00* (2009.01)

(52) U.S. Cl.
CPC .......... *H04W 4/40* (2018.02); *H04W 56/001* (2013.01)

(58) Field of Classification Search
CPC ..... H04W 4/46; H04W 88/08; H04W 56/001; H04W 4/40; G06N 20/00; G06N 3/08
See application file for complete search history.

(56) References Cited

U.S. PATENT DOCUMENTS

2019/0035275 A1   1/2019  Nishi
2022/0032955 A1*  2/2022  Xiang ................ B60W 50/029
(Continued)

FOREIGN PATENT DOCUMENTS

KR   10-2020-0094641 A   8/2020

OTHER PUBLICATIONS

Le Liang et al., "Spectrum Sharing in Vehicular Networks Based on Multi-Agent Reinforcement Learning", IEEE Journal on Selected Areas in Communications, vol. 37, No. 10, Oct. 2019, pp. 2282-2292, see pp. 2282 and 2285-2286; and figure 2.

(Continued)

*Primary Examiner* — Congvan Tran
(74) *Attorney, Agent, or Firm* — BRYAN CAVE LEIGHTON PAISNER LLP

(57) ABSTRACT

A method for performing reinforcement learning by a V2X communication device in an autonomous driving system, specifically, a method for performing reinforcement learning in consideration of a reward application ratio over time, is proposed. Action information is transmitted to a second V2X communication device, reward information is received from the second V2X communication device, and reinforcement learning is performed on the basis of a reward, wherein a reward corresponding to a ratio determined by a first V2X communication device is applied to the reinforcement learning, the ratio is determined on the basis of a time interval from a time point of transmission of the action information to a time point of reception of the reward information, and the ratio is between 0 and 1, both inclusive.

16 Claims, 41 Drawing Sheets

(56) References Cited

U.S. PATENT DOCUMENTS

| | | | |
|---|---|---|---|
| 2022/0297699 A1* | 9/2022 | Kim ................. | H04W 4/06 |
| 2023/0008624 A1* | 1/2023 | Chen ................ | H04W 24/08 |
| 2023/0180197 A1* | 6/2023 | Kwak ............... | H04W 72/40 |
| | | | 370/329 |
| 2023/0209594 A1* | 6/2023 | Yin .................. | H04B 17/318 |
| | | | 370/252 |

OTHER PUBLICATIONS

Anis Elgabli et al., "Reinforcement Learning Based Scheduling Algorithm for Optimizing Age of Information in Ultra Reliable Low Latency Networks", arXiv:1811.06776v4, May 2019 [Retrieved on May 25, 2021]. Retrieved from<https://arxiv.org/pdf/1811.06776v4.pdf>, see pp. 2-4.

Mengjie Yi et al., "Deep Reinforcement Learning for Fresh Data Collection in UAV-assisted IoT Networks", arXiv:2003.00391v1, Mar. 1, 2020 [Retrieved on May 25, 2021]. Retrieved from<https://arxiv.org/pdf/2003.00391v1.pdf>, see pp. 2-4.

International Search Report from PCT/KR2020/012430, dated Jun. 11, 2021.

* cited by examiner

FIG. 11
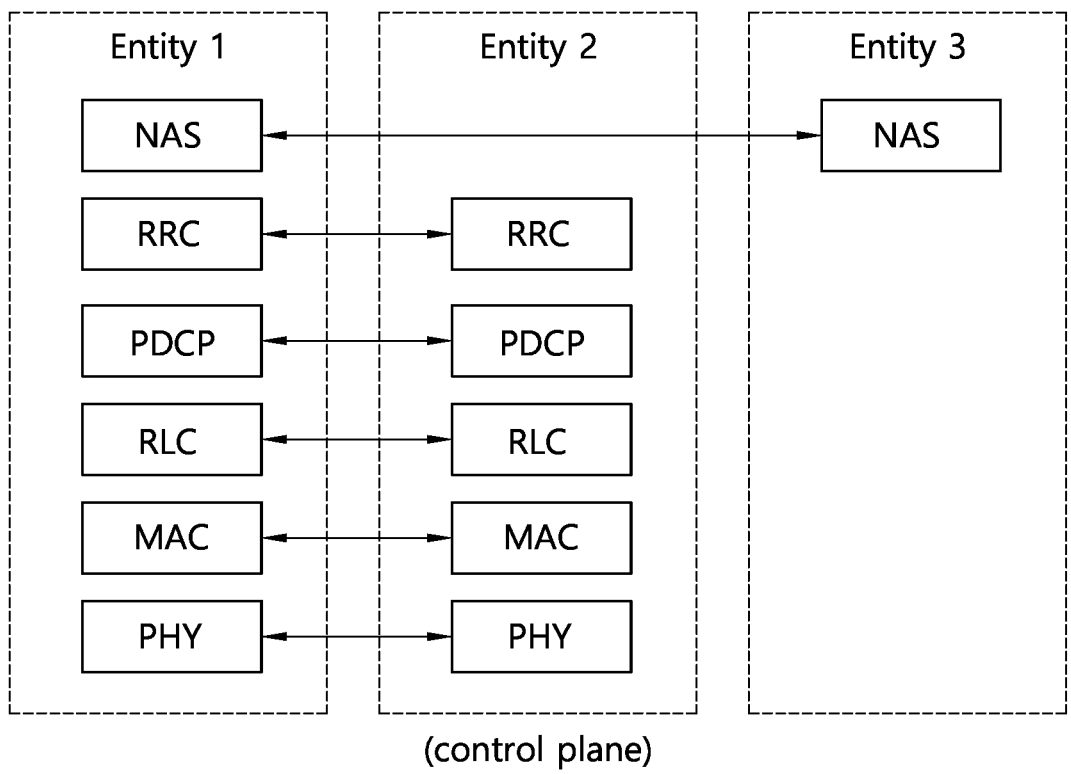
(control plane)
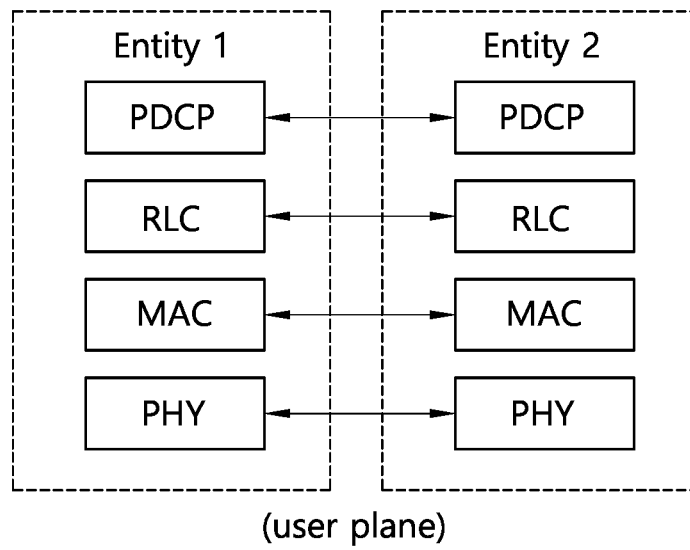
(user plane)

FIG. 35
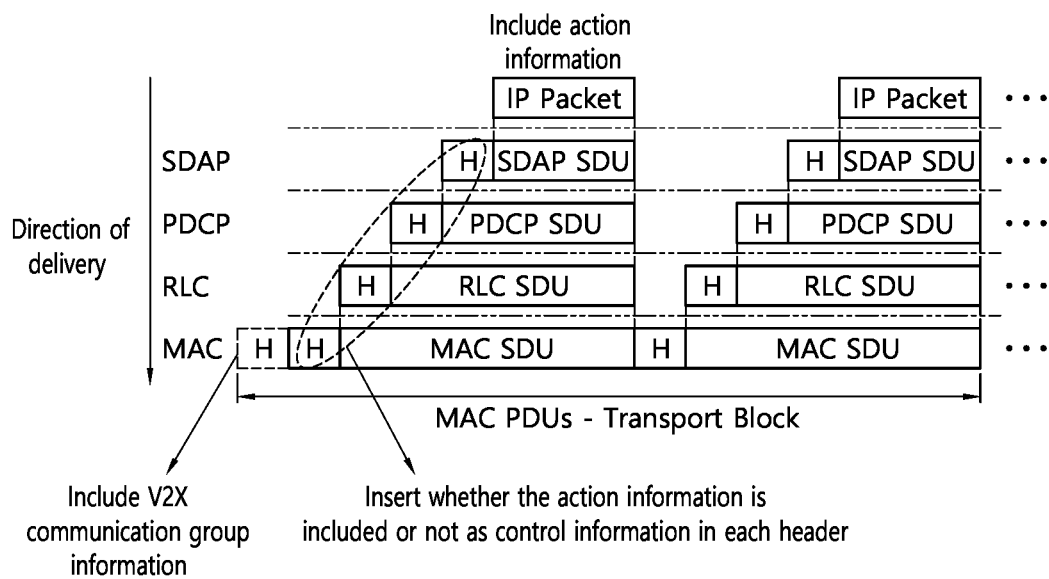
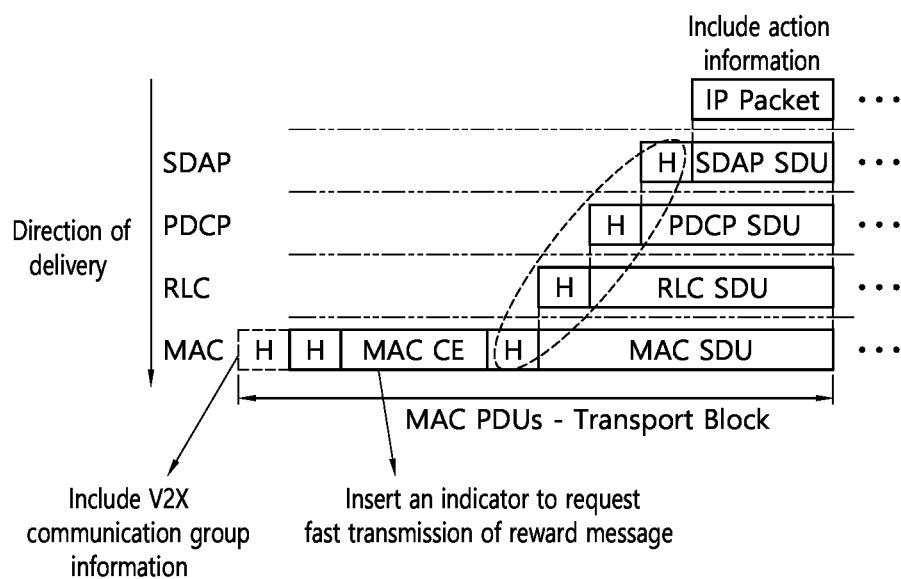

METHOD FOR PERFORMING REINFORCEMENT LEARNING BY V2X COMMUNICATION DEVICE IN AUTONOMOUS DRIVING SYSTEM

CROSS-REFERENCE TO RELATED APPLICATIONS

This application is the National Stage filing under 35 U.S.C. 371 of International Application No. PCT/KR2020/012430, filed on Sep. 15, 2020 which is hereby incorporated by reference herein in its entirety.

TECHNICAL FIELD

The present disclosure relates to wireless communications and AI.

BACKGROUND

Reinforcement learning is a branch of machine learning, which is a method for a defined agent in an environment to recognize its current state and select an action or sequence of actions that maximizes its reward from a set of possible actions. While traditional machine learning requires large amounts of data to be fed into the system to learn, reinforcement learning does not require large amounts of data to be fed into the system because the AI learns by trial and error, so there is no training set of input-output pairs.

In reinforcement learning, an episode is a sequence (of states, actions, rewards) that an agent goes through from an initial state to a terminal state, and if the length of the episode is infinite or a very long problem, the end of the episode is unknown during the learning process. Therefore, it is desirable to apply online learning in reinforcement learning, where information is continuously processed and rewarded.

In a vehicle that performs autonomous driving based on reinforcement learning, numerous actions are performed before it starts and stops, and these actions are performed periodically and continuously. In order to learn from various data from the environment through actions, the system should be configured in such a way that the vehicle communicates its action to other vehicles and devices such as roadside units (RSUs) that can communicate with it, and learns by collecting the rewards it receives from interacting with the environment of the receiving devices. Consideration should be given to how to incorporate rewards into learning in applications such as autonomous driving that require periodic and continuous real-time behavioral reward updates.

SUMMARY

According to the present disclosure, a method for performing reinforcement learning of a V2X communication device in an autonomous driving system is proposed, and more specifically, a method for performing reinforcement learning that considers an application rate of a reward over time is proposed.

According to the present disclosure, in an environment where reinforcement learning is used to implement autonomous driving technology in an autonomous driving system, a method for calculating a reflection ratio through AoI for rewards received from various environments for an action, and using it for online learning, and transmitting and receiving it through V2X communication is proposed. In particular, by measuring the freshness/newness of rewards received from various environments, old rewards can be reflected relatively less in learning for an action performed. This allows learning to reflect the appropriate reward for the action, so that an autonomous driving system equipped with reinforcement learning can find the optimal policy for the environment in which it is operating.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 11 is a diagram illustrating a structure of a control plane and a user plane of a radio interface protocol applicable to the present disclosure.

FIG. 35 illustrates an example of a method for generating action messages.

DETAILED DESCRIPTION

Figure 1:
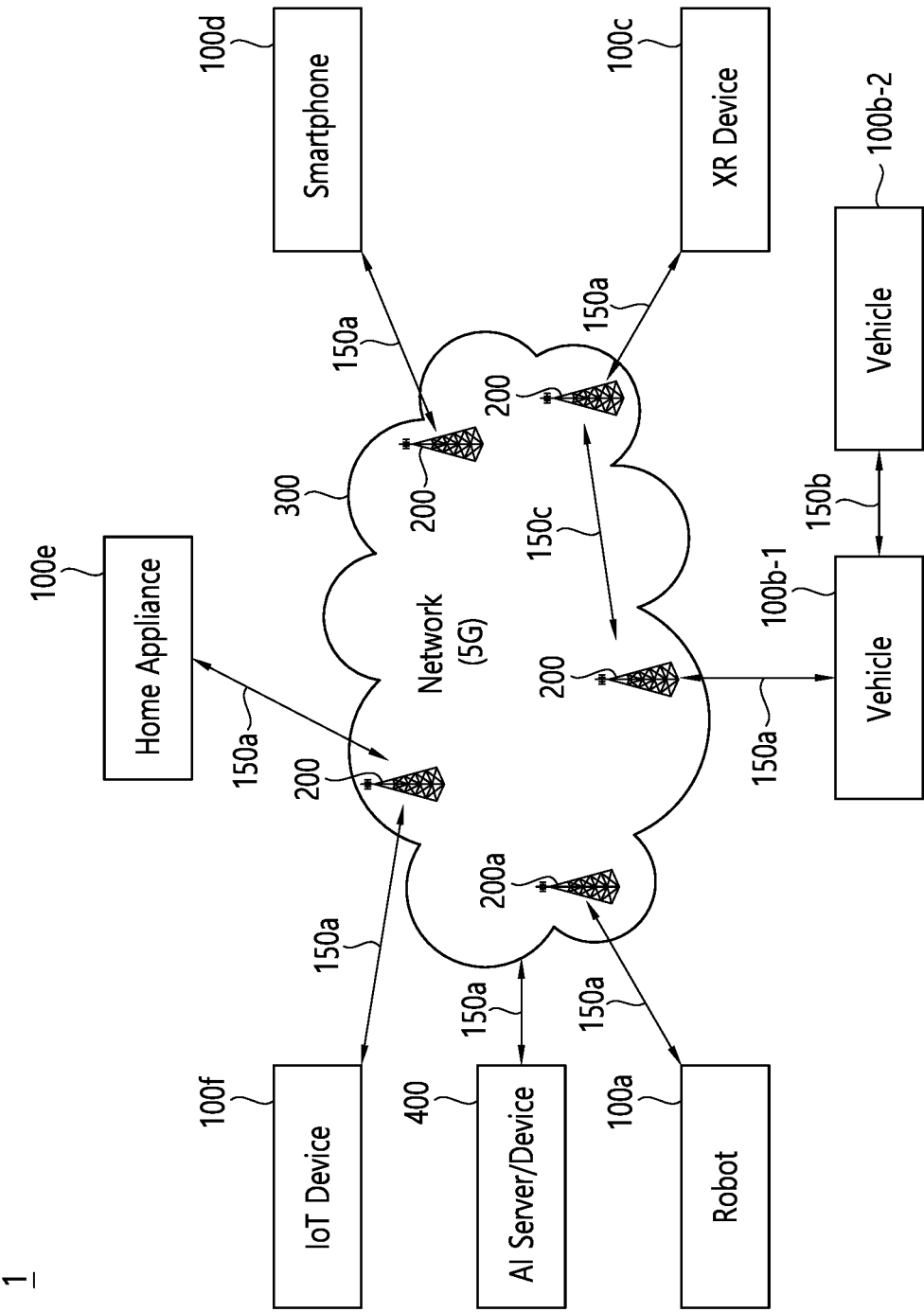
FIG. 1 is a diagram illustrating an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the present disclosure, when a certain portion "includes" or "comprises" a certain component, this indicates that other components are not excluded and may be further included unless otherwise noted. The terms "unit", "-or/er" and "module" described in the present disclosure indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the present disclosure or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an Uplink (UL). Likewise, the mobile station may serve as a receiver and the BS may serve as a transmitter, on a Downlink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, 3GPP $5^{th}$ Generation (5G) New Radio (NR) system, and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc., used in the present disclosure, refer to matters described in the standard documents published prior to the present disclosure. For example, reference may be made to the standard documents 36.xxx and 38.xxx. Hereinafter, a communication system applicable to the present disclosure is described.

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a diagram illustrating an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an Artificial Intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an Unmanned Aerial Vehicle (UAV) (e.g., a drone). The XR device 100c may include an Augmented Reality (AR)/Virtual Reality (VR)/Mixed Reality (MR) device and may be implemented in the form of a Head-Mounted Device (HMD), a Head-Up Display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology may be applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication (or D2D communication) 150b or communication 150c between base stations (e.g., relay, Integrated Access Backhaul (JAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes, various signal processing procedures (e.g., channel encoding/decoding, modulation/demodulation, resource mapping/demapping, etc.), resource allocation processes, etc., for transmission/reception of radio signals may be performed.

Figure 2:
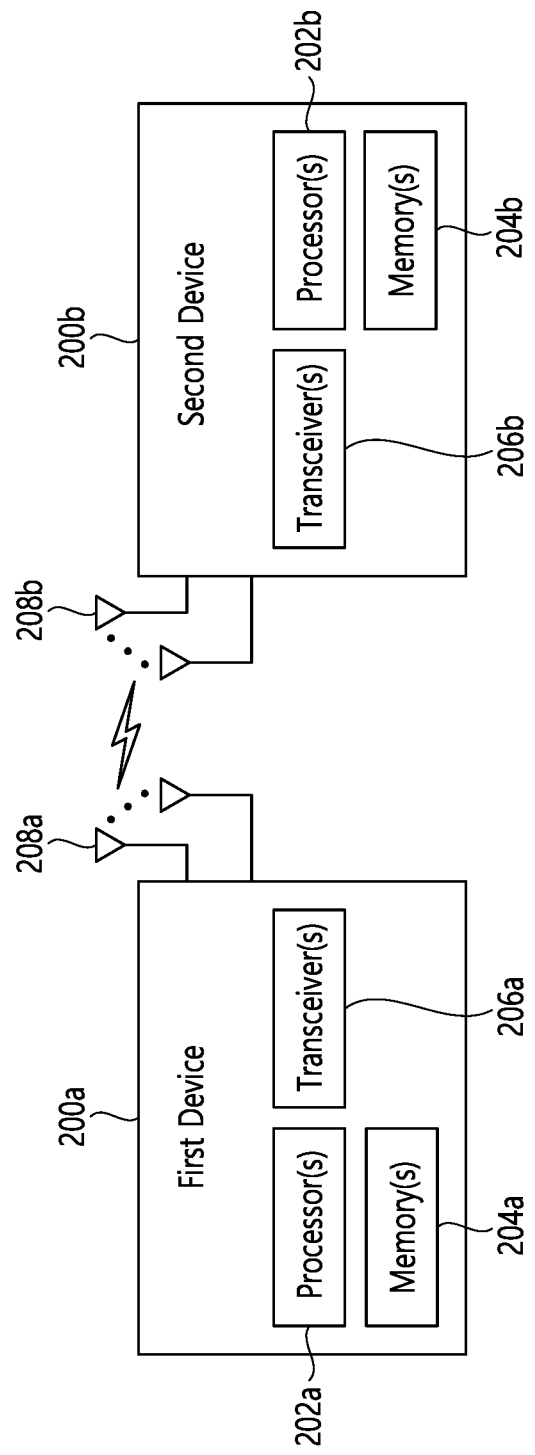
FIG. 2 is a diagram illustrating an example of a wireless device applicable to the present disclosure.

FIG. 2 is a diagram illustrating an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a Radio Frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a RF unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as physical (PHY), Media Access Control (MAC), Radio Link Control (RLC), Packet Data Convergence protocol (PDCP), Radio Resource Control (RRC), Service Data Adaptation Protocol (SDAP)). One or more processors 202a and 202b may generate one or more Protocol Data Units (PDUs) and/or one or more Service Data Units (SDUs) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more Application Specific Integrated Circuits (ASICs), one or more Digital Signal Processors (DSPs), one or more Digital Signal Processing Devices (DSPDs), Programmable Logic Devices (PLDs) or one or more Field Programmable Gate Arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of Read-Only Memories (ROMs), Random Access Memories (RAMs), Erasable Programmable Read-Only Memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc., described in the methods and/or operational flowcharts of the present disclosure to one or more other devices. One or more transceivers 206a and 206b may receive user data, control information, radio signals/channels, etc., described in the methods and/or operational flowcharts of the present disclosure from one or more other devices. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other devices. In addition, one or more processors 202a and 202b may perform control such that one or more transceivers 206a and 206b receive user data, control information or radio signals from one or more other devices. In addition, one or more transceivers 206a and 206b may be connected with one or more antennas 208a and 208b, and one or more transceivers 206a and 206b may be configured to transmit/receive user data, control information, radio signals/channels, etc., described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc., from RF band signals to baseband signals, in order to process the received user data, control information, radio signals/channels, etc., using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Hereinafter, a wireless device structure applicable to the present disclosure is described.

Figure 3:
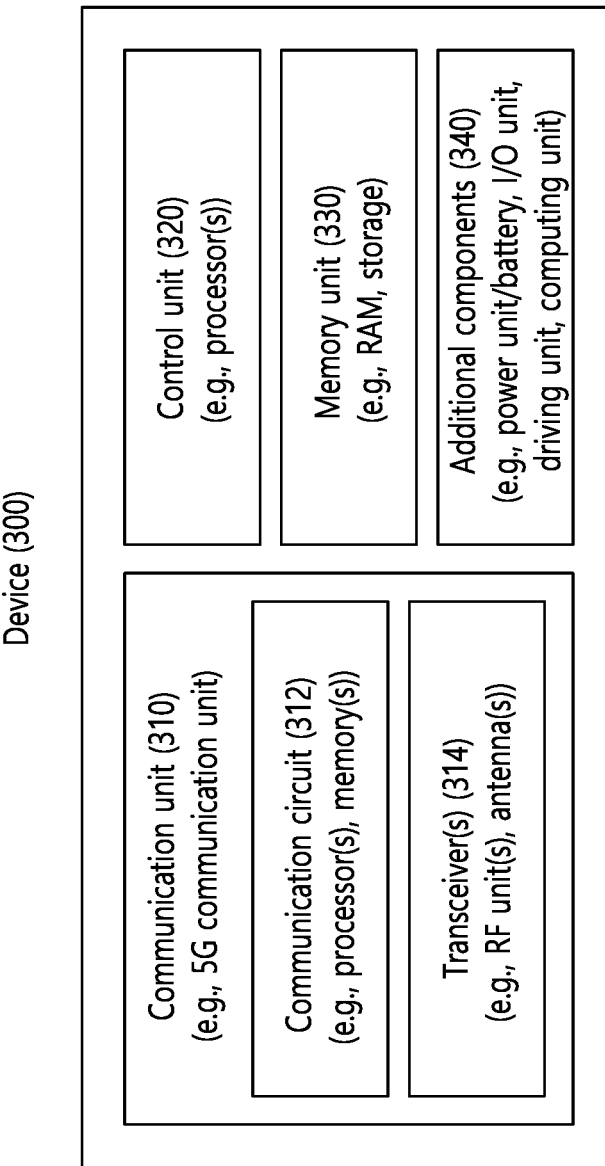
FIG. 3 is a diagram illustrating another example of a wireless device applicable to the present disclosure.

FIG. 3 is a diagram illustrating another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram device, a public safety device, an MTC device, a medical device, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an Application Processor, an Electronic Control Unit (ECU), a graphic processing processor, a memory control processor, etc. In another example, the memory unit 330 may be composed of a RAM, a Dynamic RAM (DRAM), a ROM, a flash memory, a volatile memory, a non-volatile memory and/or a combination thereof.

Hereinafter, a hand-held device applicable to the present disclosure is described.

Figure 4:
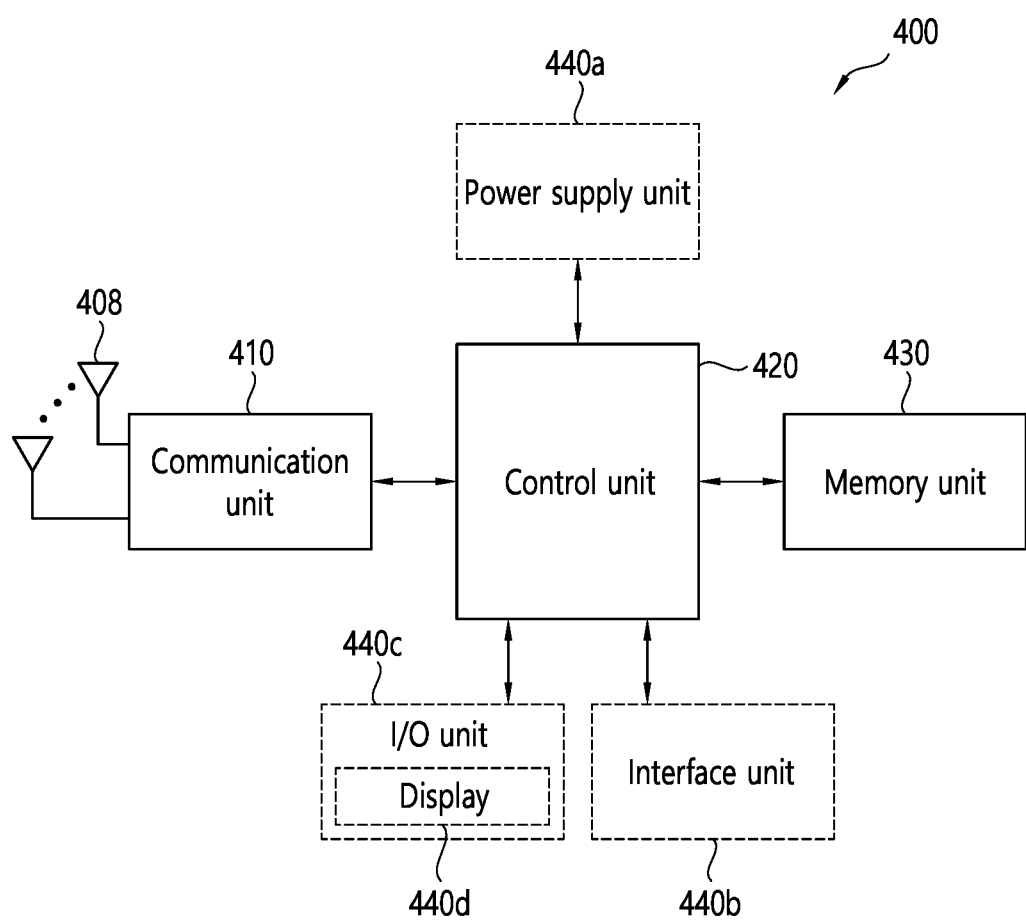
FIG. 4 is a diagram illustrating an example of a hand-held device applicable to the present disclosure.

FIG. 4 is a diagram illustrating an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a Mobile Station (MS), a User Terminal (UT), a Mobile Subscriber Station (MSS), a Subscriber Station (SS), an Advanced Mobile Station (AMS) or a Wireless Terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an Application Processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory unit 430 into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Hereinafter, types of wireless devices applicable to the present disclosure are described.

Figure 5:
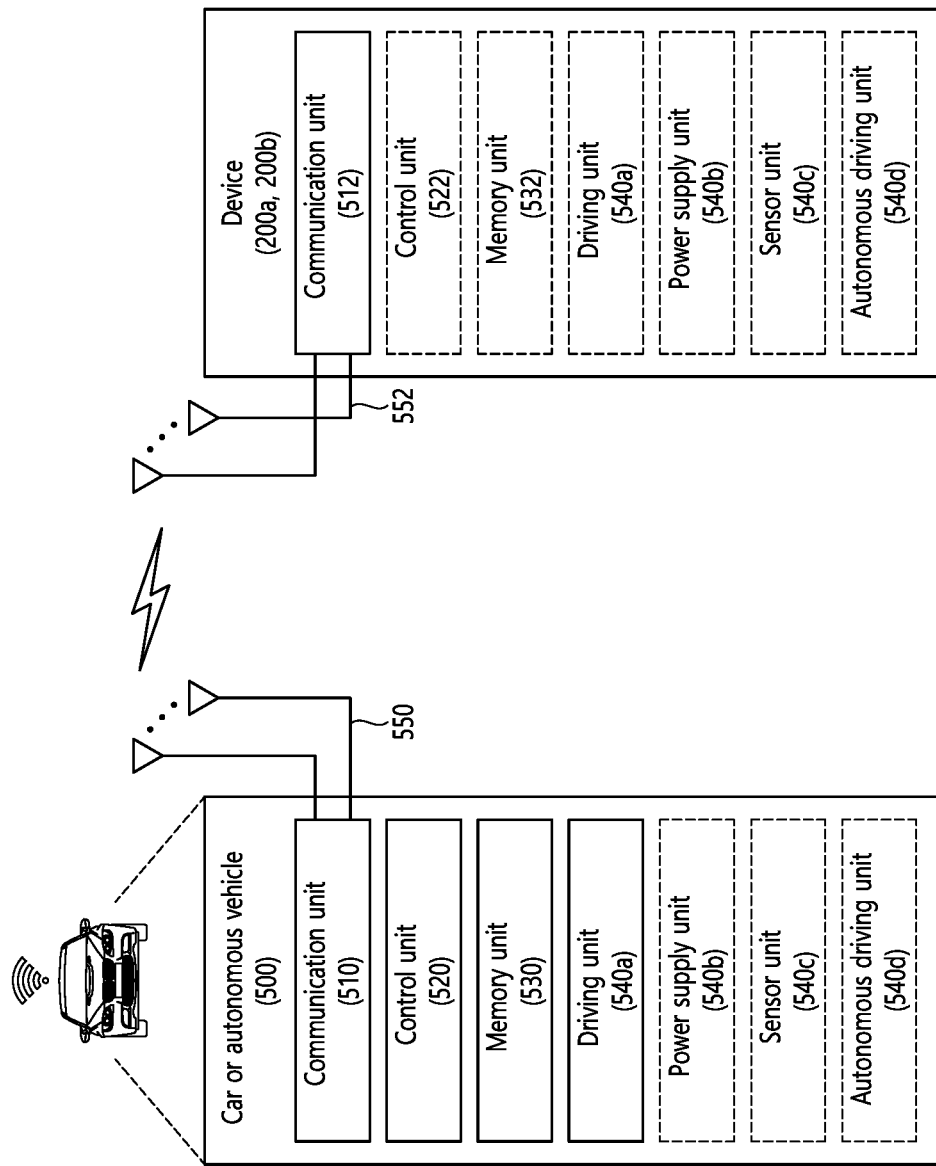
FIG. 5 is a diagram illustrating an example of a car or an autonomous driving vehicle applicable to the present disclosure.

FIG. 5 is a diagram illustrating an example of a car or an autonomous driving vehicle applicable to the present disclosure.

FIG. 5 shows a car or an autonomous driving vehicle applicable to the present disclosure. The car or the autonomous driving vehicle may be implemented as a mobile robot, a vehicle, a train, a manned/unmanned Aerial Vehicle (AV), a ship, etc., and the type of the car is not limited.

Referring to FIG. 5, the car or autonomous driving vehicle 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving vehicle 500 to perform various operations. The control unit 520 may include an Electronic Control Unit (ECU). The driving unit 540*a* may drive the car or autonomous driving vehicle 500 on the ground. The driving unit 540*a* may include an engine, a motor, a power train, wheels, a brake, a steering device, etc. The power supply unit 540*b* may supply power to the car or autonomous driving vehicle 500, and include a wired/wireless charging circuit, a battery, etc. The sensor unit 540*c* may obtain a vehicle state, surrounding environment information, user information, etc. The sensor unit 540*c* may include an Inertial Navigation Unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving unit 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc., from an external server. The autonomous driving unit 540*d* may generate an autonomous driving route and a driving plan based on the acquired data. The control unit 520 may control the driving unit 540*a* (e.g., speed/direction control) such that the car or autonomous driving vehicle 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc., to the external server. The external server may predict traffic information data using AI technology or the like based on the information collected from the cars or autonomous driving vehicles and provide the predicted traffic information data to the cars or autonomous driving vehicles.

Figure 6:
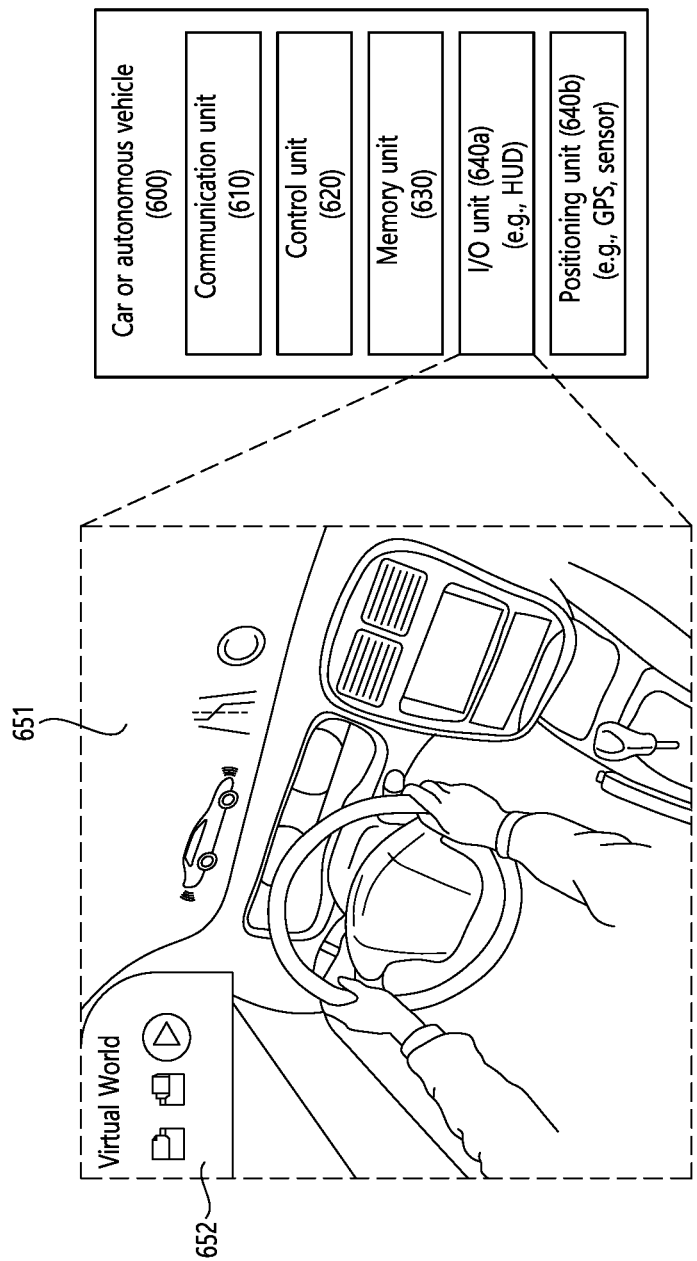
FIG. 6 is a diagram illustrating an example of a mobile object applicable to the present disclosure.

FIG. 6 is a diagram illustrating an example of a mobile object applicable to the present disclosure.

Referring to FIG. 6, the mobile object applicable to the present disclosure may be implemented as at least one of a transportation means, a train, an aerial vehicle or a ship. In addition, the mobile object applicable to the present disclosure may be implemented in the other forms and is not limited to the above-described embodiments.

In this case, referring to FIG. 6, the mobile object 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobile object or a base station. The control unit 620 may control the components of the mobile object 600 to perform various operations. The memory unit 630 may store data/parameters/programs/code/instructions supporting the various functions of the mobile object 600. The input/output unit 640*a* may output AR/VR objects based on information in the memory unit 630. The input/output unit 640*a* may include a HUD. The positioning unit 640*b* may acquire the position information of the mobile object 600. The position information may include absolute position information of the mobile object 600, position information in a driving line, acceleration information, position information of neighboring vehicles, etc. The positioning unit 640*b* may include a Global Positioning System (GPS) and various sensors.

For example, the communication unit 610 of the mobile object 600 may receive map information, traffic information, etc., from an external server and store the map information, the traffic information, etc., in the memory unit 630. The positioning unit 640*b* may acquire position information of the mobile object through the GPS and the various sensors and store the position information of the mobile object in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobile object 600 is normally driven in the driving line based on the position information of the mobile object. When the mobile object 600 abnormally deviates from the driving line, the control unit 620 may display a warning on the glass window of the mobile object 600 through the input/output unit 640*a*. In addition, the control unit 620 may broadcast a warning message for driving abnormality to neighboring mobile objects through the communication unit 610. Depending on situations, the control unit 620 may transmit the position information of the mobile object and information about driving/mobility abnormality to a related institution through the communication unit 610.

Figure 7:
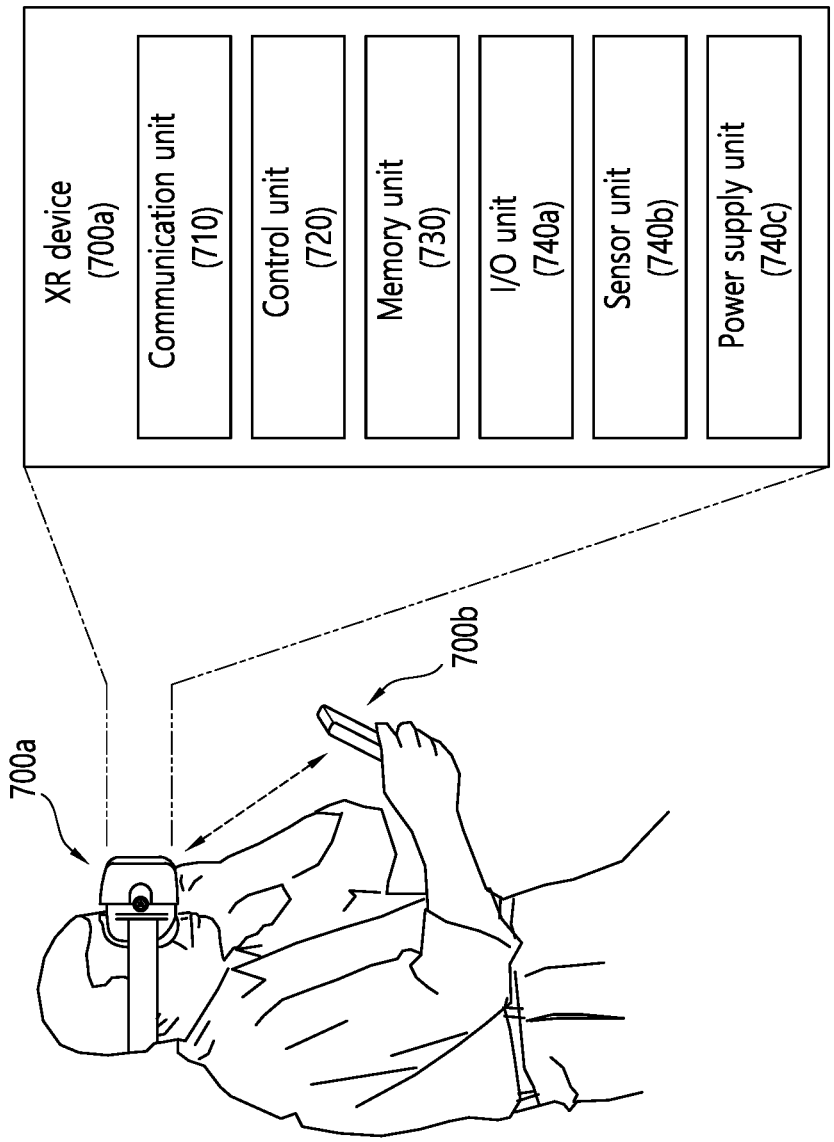
FIG. 7 is a diagram illustrating an example of an XR device applicable to the present disclosure.

FIG. 7 is a diagram illustrating an example of an XR device applicable to the present disclosure. The XR device may be implemented as an HMD, a Head-Up Display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc., from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a Red Green Blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for driving the XR device 700*a* from a user, and the control unit 720 may drive the XR device 700*a* according to the driving instruction of the user. For example, when the user wants to watch a movie, news, etc., through the XR device 700*a*, the control unit 720 may transmit content request information to another device (e.g., a hand-held device 700*b*) or a media server through the communication unit 730. The communication unit 730 may download/stream content such as a movie or news from another device (e.g., the hand-held device 700*b*) or the media server to the memory unit 730. The control unit 720 may control and/or perform procedures such as video/image acquisition, (video/image) encoding, metadata generation/processing, etc., with respect to contents, and generate/output an XR object based on information about a surrounding space or a real object acquired through the input/output unit 740*a* or the sensor unit 740*b*.

In addition, the XR device 700*a* may be wirelessly connected with the hand-held device 700*b* through the communication unit 710, and operation of the XR device 700*a* may be controlled by the hand-held device 700*b*. For example, the hand-held device 700*b* may operate as a controller for the XR device 700*a*. To this end, the XR device 700*a* may acquire three-dimensional position information of the hand-held device 700*b* and then generate and output an XR object corresponding to the hand-held device 700*b*.

Figure 8:
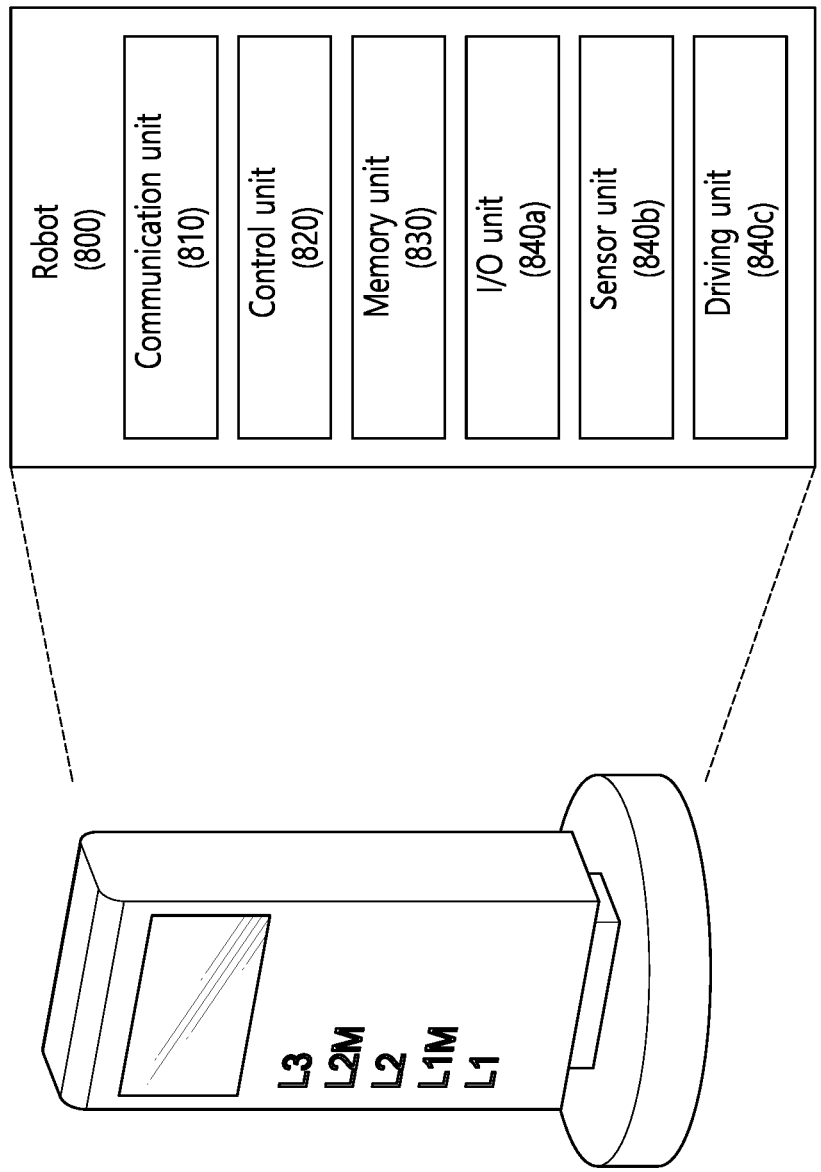
FIG. 8 is a diagram illustrating an example of a robot applicable to the present disclosure.

FIG. 8 is a diagram illustrating an example of a robot applicable to the present disclosure. For example, the robot may be classified into industrial, medical, household, military, etc., according to the purpose or field of use. In this case, referring to FIG. 8, the robot 800 may include a communication unit (transceiver) 810, a control unit (controller) 820, a memory unit (memory) 830, an input/output unit 840*a*, a sensor unit 840*b* and a driving unit 840*c*. Here, blocks 810 to 830/840*a* to 840*c* may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840*a* may acquire information from the outside of the robot 800 and output information to the outside of the robot 800. The input/output unit 840*a* may include a camera, a microphone, a user input unit, a display, a speaker and/or a haptic module.

The sensor unit 840*b* may obtain internal information, surrounding environment information, user information, etc., of the robot 800. The sensor unit 840*b* may include a proximity sensor, an illumination sensor, an acceleration sensor, a magnetic sensor, a gyro sensor, an inertia sensor, an IR sensor, a finger scan sensor, an ultrasonic sensor, an optical sensor, a microphone and/or a radar.

The driving unit 840*c* may perform various physical operations such as movement of robot joints. In addition, the driving unit 840*c* may cause the robot 800 to run on the ground or fly in the air. The driving unit 840*c* may include an actuator, a motor, wheels, a brake, a propeller, etc.

Figure 9:
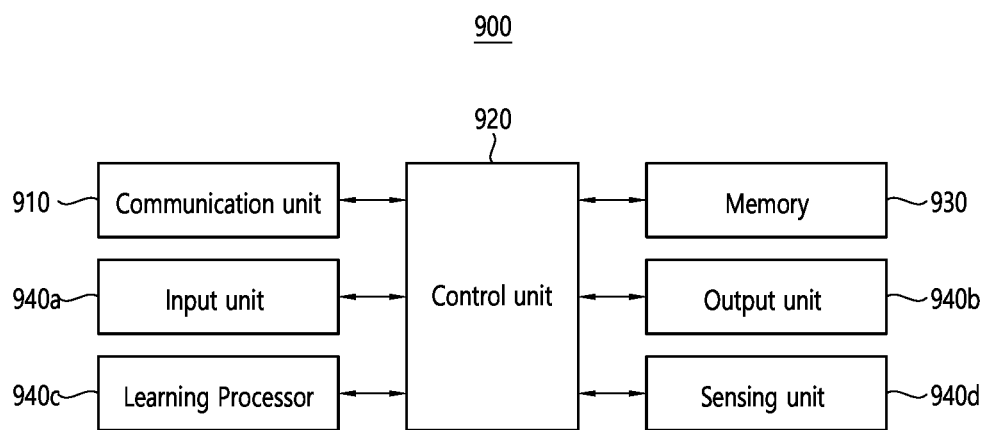
FIG. 9 is a diagram illustrating an example of an Artificial Intelligence (AI) device applicable to the present disclosure.

FIG. 9 is a diagram illustrating an example of an Artificial Intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a Set-Top Box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940a/940b, a leaning processor unit (learning processor) 940c and a sensor unit 940d. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform a predicted operation or an operation determined to be desirable from among at least one executable operation. In addition, the control unit 920 may collect history information including operation of the AI device 900 or user's feedback about the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 940c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, an RGB sensor, an IR sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Hereinafter, physical channels and general signal transmissions are described.

In a radio access system, a UE receives information from a base station on a Downlink (DL) and transmits information to the base station on an Uplink (UL). The information transmitted and received between the UE and the base station includes general data information and a variety of control information. There are many physical channels according to the types/usages of information transmitted and received between the base station and the UE.

Figure 10:
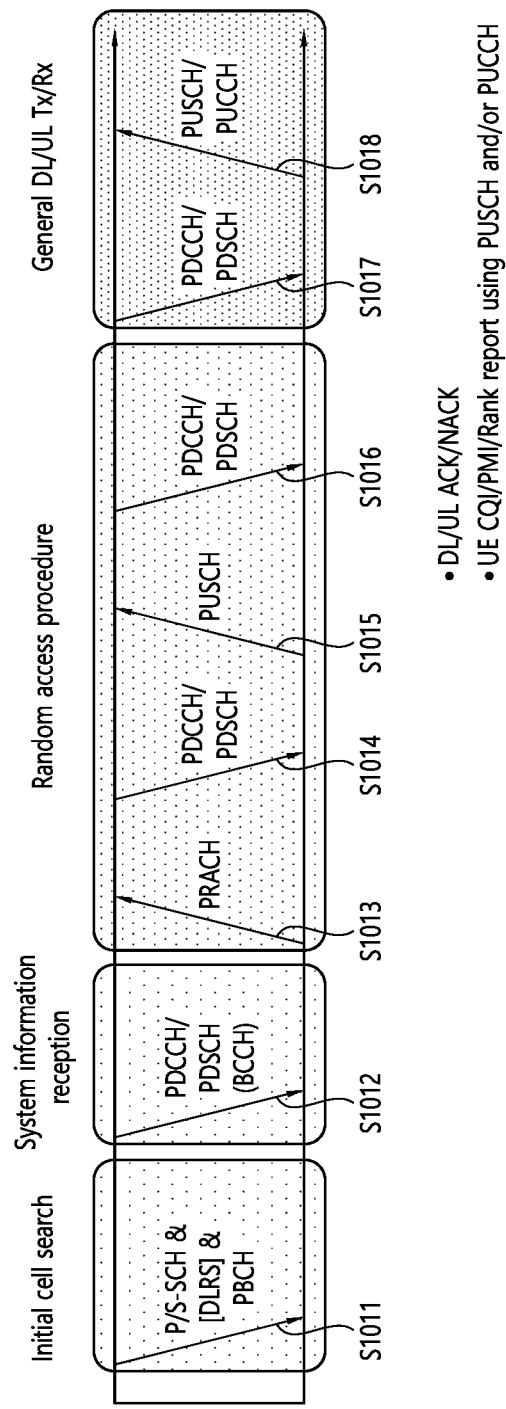
FIG. 10 is a diagram illustrating physical channels and a signal transmission method using the same applicable to the present disclosure.

FIG. 10 is a diagram illustrating physical channels and a signal transmission method using the same applicable to the present disclosure.

In step S1011, the UE which is turned on again in a state of being turned off or has newly entered a cell performs initial cell search operation such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a Physical Broadcast Channel (PBCH) signal from the base station and acquire broadcast information in the cell. Meanwhile, the UE may receive a Downlink Reference Signal (DL RS) in an initial cell search step and check a downlink channel state. In step S1012, the UE which has completed initial cell search may receive a Physical Downlink Control Channel (PDCCH) and a Physical Downlink Shared Channel (PDSCH) according to physical downlink control channel information, thereby acquiring more detailed system information.

Thereafter, the UE may perform a random access procedure such as steps S1013 to S1016 in order to complete access to the base station. To this end, the UE may transmit a preamble through a Physical Random Access Channel (PRACH) (S1013) and receive a Random Access Response (RAR) for the preamble through a physical downlink control channel and a physical downlink shared channel corresponding thereto (S1014). The UE may transmit a Physical Uplink Shared Channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a Physical Uplink Shared Channel (PUSCH) signal and/or a Physical Uplink Control Channel (PUCCH) signal (S1018) as general uplink/downlink signal transmission procedures.

The control information transmitted from the UE to the base station is collectively referred to as Uplink Control Information (UCI). The UCI includes Hybrid Automatic Repeat and request Acknowledgement/Negative-ACK (HARQ-ACK/NACK), Scheduling Request (SR), Channel Quality Indication (CQI), Precoding Matrix Indication (PMI), Rank Indication (RI), Beam Indication (BI) information, etc. In this case, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

FIG. 11 is a diagram illustrating a structure of a control plane and a user plane of a radio interface protocol applicable to the present disclosure.

Referring to FIG. 11, an entity 1 may be a User Equipment (UE). In this case, the UE may be at least one of a wireless device, a hand-held device, a vehicle, a mobile object, an XR device, a robot or an AI device, to which the present disclosure is applicable in FIGS. 1 to 9. In addition, the UE refers to a device to which the present disclosure is applicable, and is not limited to a specific apparatus or device.

An entity 2 may be a base station. In this case, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

An entity 3 may be a network apparatus or a device for performing a network function. In this case, the network apparatus may be a core network node for managing mobility (e.g., Mobility Management Entity (MME), an Access and mobility Management Function (AMF), etc.). In addition, the network function may refer a function implemented in order to perform a network function. The entity 3 may be a device to which a function is applied. That is, the entity 3 may refer to a function or device for performing a network function and is not limited to a specific device.

A control plane refers to a path used for transmission of control messages, which are used by the UE and the network to manage a call. A user plane refers to a path in which data generated in an application layer, e.g., voice data or Internet packet data, is transmitted. In this case, the physical layer, the first layer, may provide information transfer services to the upper layers using physical channels. The physical layer is connected to the upper Medium Access Control (MAC) layer through a transport channel. In this case, data may be transferred between the MAC layer and the physical layer through the transport channel. Data may be transferred between the physical layer on the transmitting side and the receiving side through the physical channel. In this case, the physical channel utilizes time and frequency as radio resources.

The Medium Access Control (MAC) layer of the second layer provides services to the upper Radio Link Control (RLC) layer through logical channels. The RLC layer of the second layer may support reliable data transmission. The function of the RLC layer may be implemented by a functional block within the MAC layer. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having relatively narrow bandwidth. A Radio Resource Control (RRC) layer located at the bottommost portion of the third layer is defined only in the control plane. The RRC layer serves to control logical channels, transport channels, and physical channels in relation to configuration, re-configuration, and release of radio bearers. A Radio Bearer (RB) refers to a service provided by the second layer to transmit data between the UE and the network. To this end, the RRC layer of the UE and the RRC layer of the network may exchange RRC messages. A Non-Access Stratum (NAS) layer located at an upper level of the RRC layer performs functions such as session management and mobility management, etc. One cell configuring a base station may be configured with one of various bandwidths to provide a downlink or uplink transmission service to several UEs. Different cells may be configured to provide different bandwidths. Downlink transport channels for transmitting data from a network to a UE may include a Broadcast Channel (BCH) for transmitting system information, a Paging Channel (PCH) for transmitting paging messages, and a DL Shared Channel (DL-SCH) for transmitting user traffic or control messages. Traffic or control messages of a DL multicast or broadcast service may be transmitted through the DL-SCH or may be transmitted through a separate DL Multicast Channel (MCH). Meanwhile, UL transport channels for transmitting data from the UE to the network include a Random Access Channel (RACH) for transmitting initial control messages and a UL-SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 12:
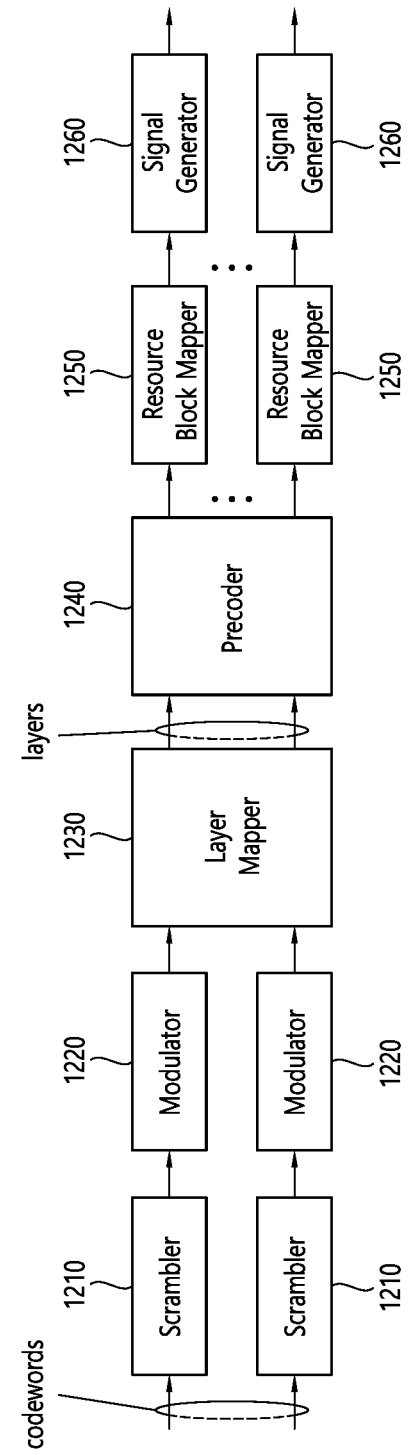
FIG. 12 is a diagram illustrating a method of processing a transmitted signal applicable to the present disclosure.

FIG. 12 is a diagram illustrating a method of processing a transmitted signal applicable to the present disclosure. For example, the transmitted signal may be processed by a signal processing circuit. In this case, a signal processing circuit 1200 may include a scrambler 1210, a modulator 1220, a layer mapper 1230, a precoder 1240, a resource mapper 1250, and a signal generator 1260. In this case, for example, the operation/function of FIG. 12 may be performed by the processors 202$a$ and 202$b$ and/or the transceiver 206$a$ and 206$b$ of FIG. 2. In addition, for example, the hardware element of FIG. 12 may be implemented in the processors 202$a$ and 202$b$ of FIG. 2 and/or the transceivers 206$a$ and 206$b$ of FIG. 2. For example, blocks 1010 to 1060 may be implemented in the processors 202$a$ and 202$b$ of FIG. 2. In addition, blocks 1210 to 1250 may be implemented in the processors 202$a$ and 202$b$ of FIG. 2 and a block 1260 may be implemented in the transceivers 206$a$ and 206$b$ of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a scrambled bit sequence by the scrambler 1210. The scramble sequence used for scramble is generated based on an initial value and the initial value may include ID information of a wireless device, etc. The scrambled bit sequence may be modulated into a modulated symbol sequence by the modulator 1220. The modulation scheme may include pi/2-Binary Phase Shift Keying (pi/2-BPSK), m-Phase Shift Keying (m-PSK), m-Quadrature Amplitude Modulation (m-QAM), etc.

A complex modulation symbol sequence may be mapped to one or more transmission layer by the layer mapper 1230. Modulation symbols of each transmission layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transmission layers. Here, the precoder 1240 may perform precoding after transform precoding (e.g., Discrete Fourier Transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an Inverse Fast Fourier Transform (IFFT) module, a Cyclic Prefix (CP) insertor, a Digital-to-Analog Converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an Analog-to-Digital Converter (ADC), a CP remover, and a Fast Fourier Transform (FFT) module. Thereafter, the baseband signal may be restored to a codeword through a resource de-mapper process, a post-coding process, a demodulation process and a de-scrambling process. The codeword may be restored to an original information block through decoding. Accordingly, a signal processing circuit (not shown) for a received signal may include a signal restorer, a resource de-mapper, a post-coder, a demodulator, a de-scrambler and a decoder.

Figure 13:
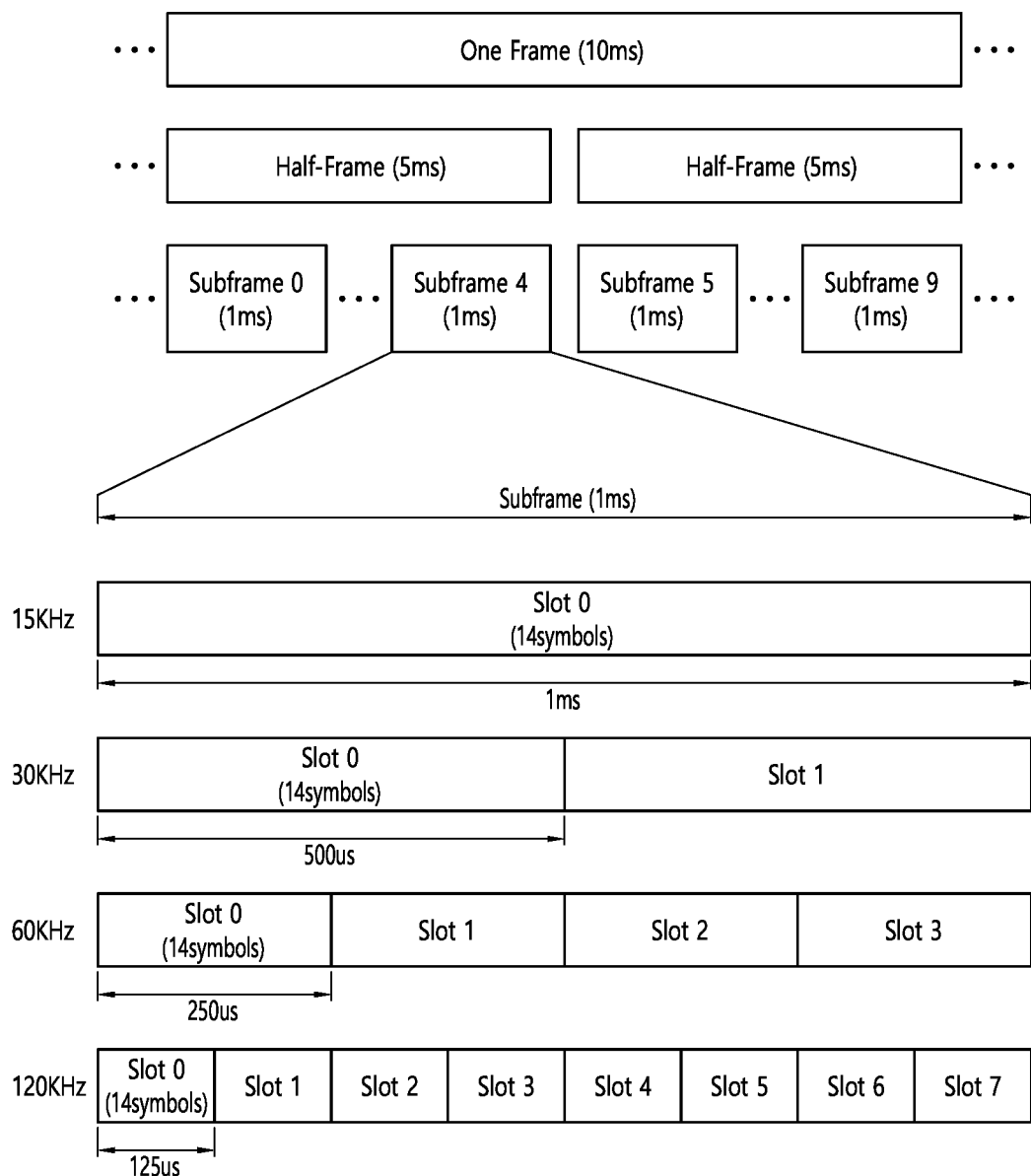
FIG. 13 is a diagram illustrating a structure of a radio frame applicable to the present disclosure.

FIG. 13 is a diagram illustrating a structure of a radio frame applicable to the present disclosure.

UL and DL transmission based on an NR system may be based on the frame shown in FIG. 13. In this case, one radio frame has a length of 10 ms and may be defined as two 5-ms Half-Frames (HFs). One half-frame may be defined as five 1-ms subframes (SFs). One subframe may be divided into one or more slots and the number of slots in the subframe may depend on Subscriber Spacing (SCS). In this case, each slot may include 12 or 14 OFDM(A) symbols according to Cyclic Prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot, the number of slots per frame and the number of slots per subframe according to SCS when normal CP is used, and Table 2 shows the number of symbols per slot, the number of slots per frame and the number of slots per subframe according to SCS when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N^{slot}_{symb}$ may indicate the number of symbols in a slot, $N^{frame,\mu}_{slot}$ may indicate the number of slots in a frame, and $N^{subframe,\mu}_{slot}$ may indicate the number of slots in a subframe.

In addition, in a system to which the present disclosure is applicable, OFDM(A) numerology (e.g., SCS, CP length, etc.) may be differently configured among a plurality of cells merged to one UE. Accordingly, an (absolute time) period of a time resource (e.g., an SF, a slot or a TTI) (for convenience, collectively referred to as a Time Unit (TU)) composed of the same number of symbols may be differently configured between merged cells.

NR may support a plurality of numerologies (or Subscriber Spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz - 7125 MHz | 15, 30, 60 KHz |
| FR2 | 24250 MHz - 52600 MHz | 60, 120, 240 kHz |

In addition, for example, in a communication system to which the present disclosure is applicable, the above-described numerology may be differently configured. For example, a Terahertz wave (THz) band may be used as a frequency band higher than FR2. In the THz band, the SCS may be configured greater than that of the NR system, and the number of slots may be differently configured, without being limited to the above-described embodiments. The THz band will be described below.

Figure 14:
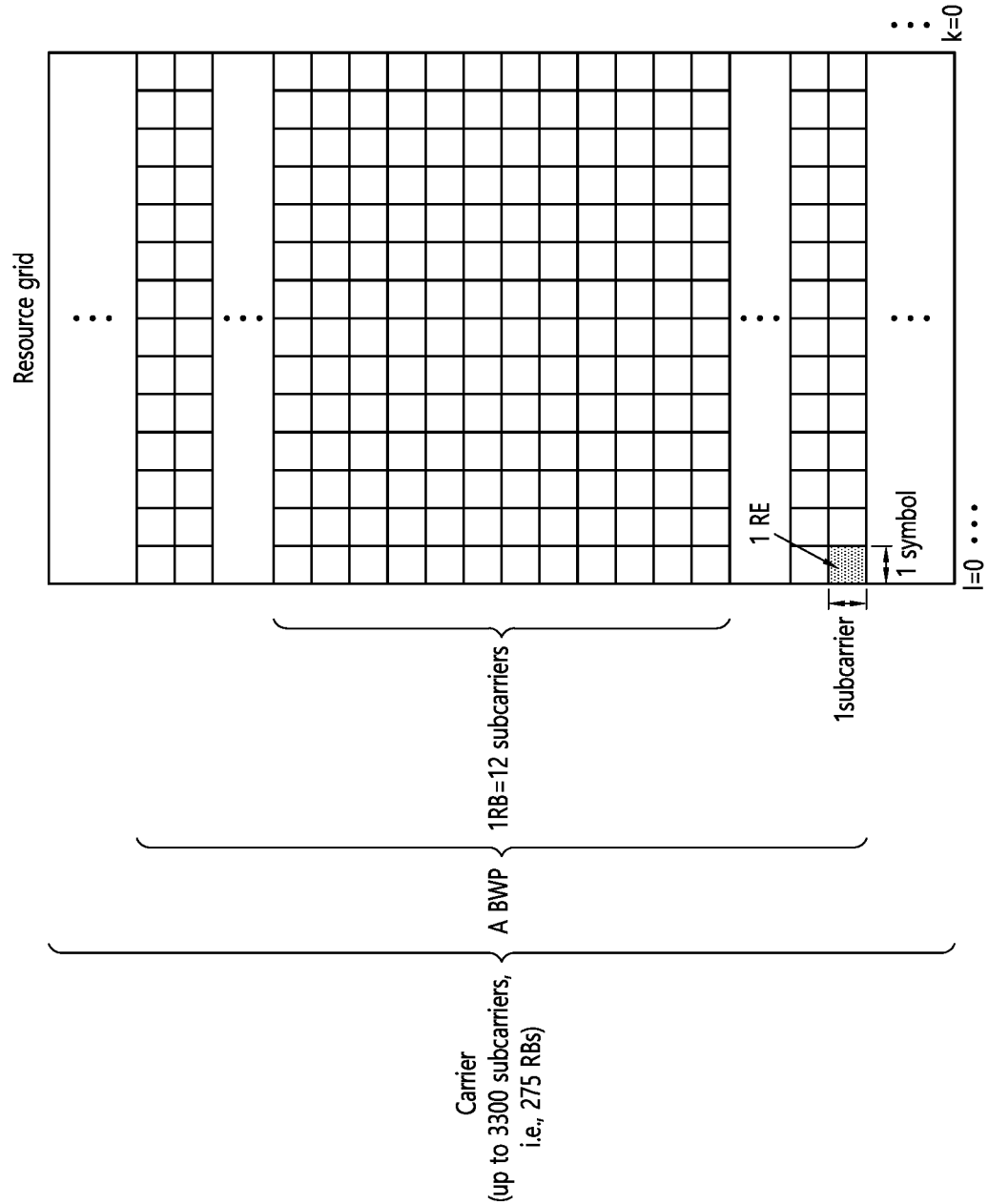
FIG. 14 is a diagram illustrating a slot structure applicable to the present disclosure.

FIG. 14 is a diagram illustrating a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A Resource Block (RB) may be defined as a plurality (e.g., 12) of consecutive subcarriers in the frequency domain.

In addition, a Bandwidth Part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a Resource Element (RE) and one complex symbol may be mapped.

Hereinafter, a 6G communication system is described.

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

In this case, the 6G system may have key factors such as enhanced Mobile Broadband (eMBB), Ultra-Reliable Low Latency Communications (URLLC), massive Machine Type Communications (mMTC), AI integrated communication, tactile Internet, high throughput, high network capacity, high energy efficiency, low backhaul and access network congestion and enhanced data security.

Figure 15:
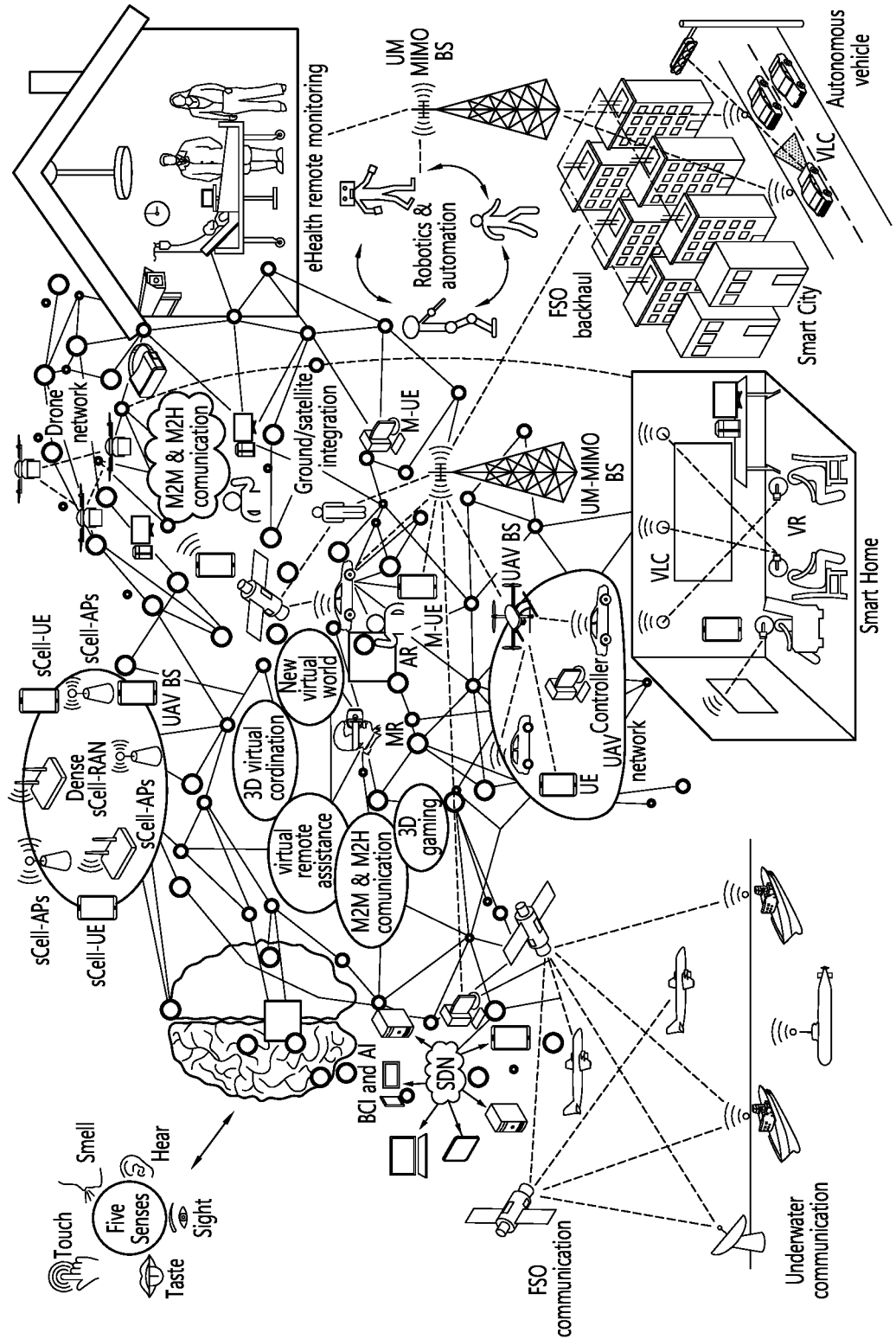
FIG. 15 is a diagram illustrating an example of a communication structure providable in a 6G system applicable to the present disclosure.

FIG. 15 is a diagram illustrating an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. In this case, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, Wireless Information and Energy Transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and Beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and Free Space Optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Hereinafter, core implementation technologies of 6G system are described.

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a Brain Computer Interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, Multiple Input Multiple Output (MIMO) mechanisms based on deep learning, resource scheduling and allocation based on AI, etc., may be included.

Machine learning may be used for channel estimation and channel tracking and may be used for power allocation, interference cancellation, etc., in the physical layer of DL. In addition, machine learning may be used for antenna selection, power control, symbol detection, etc., in the MIMO system.

However, application of a Deep Neutral Network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Such static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, i.e., supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to the input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning rate may be differently applied according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the characteristics of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a Deep Neural Network (DNN) method, a Convolutional deep Neural Network (CNN) method and a Recurrent Boltzmman machine (RNN) method. Such a learning model may be applied.

Hereinafter, a Terahertz (THz) communication is described.

THz communication is applicable to the 6G system. For example, a data rate may increase by increasing bandwidth. This may be performed by using sub-TH communication with wide bandwidth and applying advanced massive MIMO technology.

Figure 16:
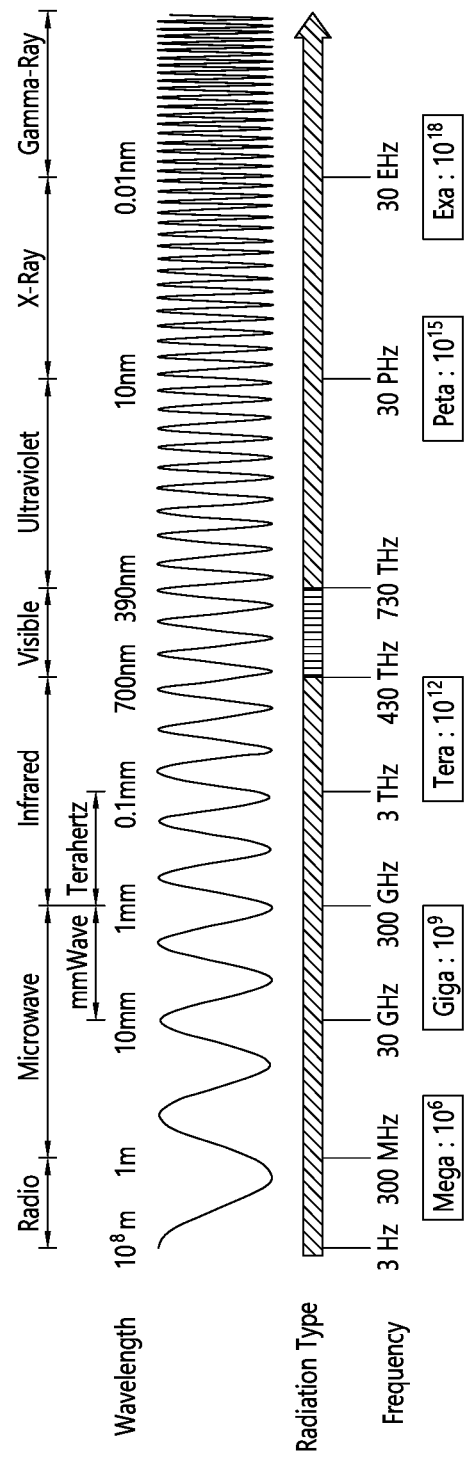
FIG. 16 is a diagram illustrating an electromagnetic spectrum applicable to the present disclosure.

FIG. 16 is a diagram illustrating an electromagnetic spectrum applicable to the present disclosure. For example, referring to FIG. 16, THz waves which are known as sub-millimeter radiation, generally refers a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far IR frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Hereinafter, an optical wireless technology is described.

Optical Wireless Communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as Free Space Optical (FSO) communication based on light fidelity, visible light communication, optical camera communication and wide band are well-known technologies. Communication based on optical wireless technology may provide a very high data rate, low latency and safe communication.

Light Detection and Ranging (LiDAR) may also be used for ultra-high resolution 3D mapping in 6G communication based on wide band.

Hereinafter, an FSO backhaul network is described.

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Hereinafter, a massive MIMO technology is described.

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Hereinafter, a blockchain is described.

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a Peer-to-Peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

Hereinafter, a 3D networking is described.

The 6G system integrates terrestrial and aerial networks to support vertical expansion of user communication. A 3D BS will be provided through low-orbit satellites and UAVs. Adding new dimensions in terms of altitude and related degrees of freedom makes 3D connections significantly different from existing 2D networks.

Hereinafter, a quantum communication is described.

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Hereinafter, an unmanned aerial vehicle is described.

An Unmanned Aerial Vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring, etc. Therefore, UAV technology is recognized as one of the most important technologies for 6G communication.

Hereinafter, cell-free communication is described.

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Hereinafter, Wireless Information and Energy Transfer (WIET) is described.

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Hereinafter, integration of sensing and communication is described.

An autonomous wireless network is a function for continuously detecting a dynamically changing environment state and exchanging information between different nodes. In 6G, sensing will be tightly integrated with communication to support autonomous systems.

Hereinafter, integration of access backhaul network is described.

In 6G, the density of access networks will be enormous. Each access network is connected by optical fiber and backhaul connection such as FSO network. To cope with a very large number of access networks, there will be a tight integration between the access and backhaul networks.

Hereinafter, hologram beamforming is described.

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram Beamforming (HBF) is a new beamforming method that differs significantly from MIMO systems because this uses a software-defined antenna. HBF will be a very effective approach for efficient and flexible transmission and reception of signals in multi-antenna communication devices in 6G.

Hereinafter, big data analysis is described.

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Hereinafter, Large Intelligent Surface (LIS) is described.

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, i.e., signals are only passively reflected without using active RF chains. In addition, since each of the passive reflectors of the LIS should independently adjust the phase shift of an incident signal, this may be advantageous for wireless communication channels. By properly adjusting the phase shift through an LIS controller, the reflected signal can be collected at a target receiver to boost the received signal power.

Hereinafter, a THz wireless communication is described.

Figure 17:
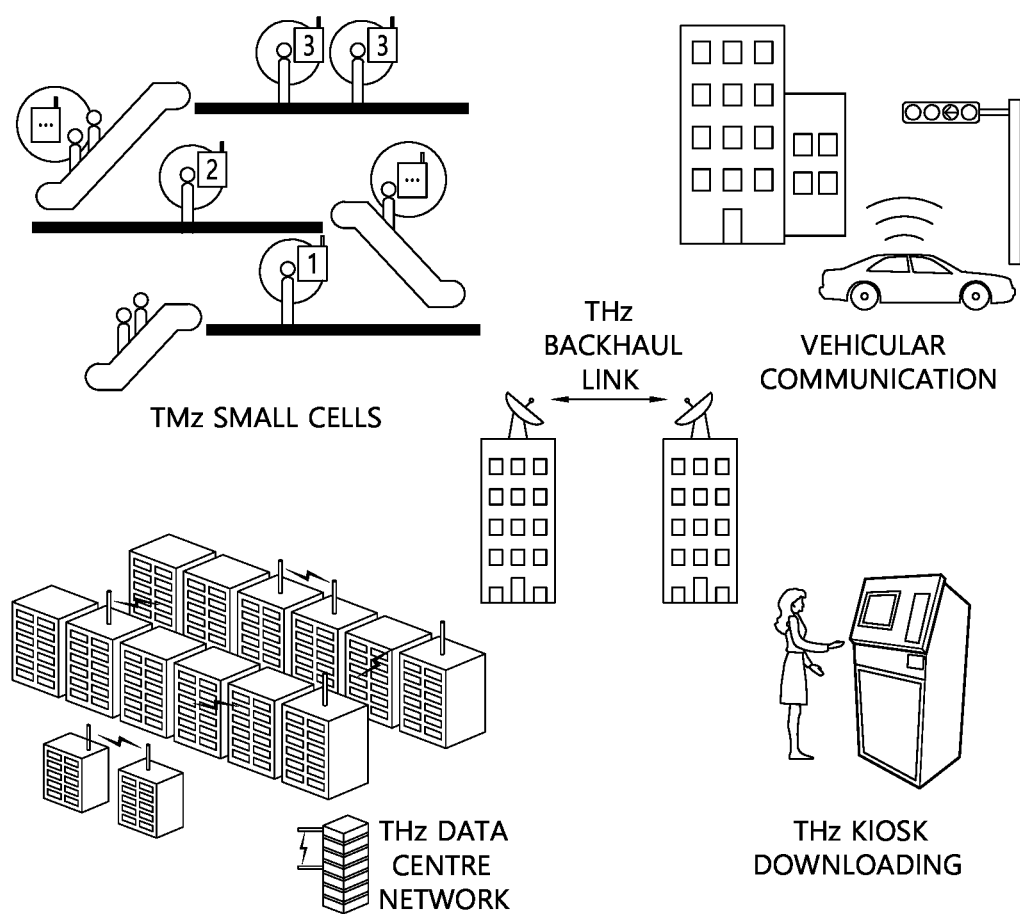
FIG. 17 is a diagram illustrating a THz communication method applicable to the present disclosure.

FIG. 17 is a diagram illustrating a THz communication method applicable to the present disclosure.

Referring to FIG. 17, THz wireless communication uses a THz wave having a frequency of approximately 0.1 to 10 THz (1 THz=1012 Hz), and may refer terahertz (THz) band wireless communication using a very high carrier frequency of 100 GHz or more. The THz wave is located between Radio Frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion about THz wireless communication is being discussed mainly in IEEE 802.15 THz Working Group (WG) in addition to 3GPP, and standard documents issued by a Task Group (TG) of IEEE 802.15 (e.g., TG3d, TG3e) specify and supplement the description of the present disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to Vehicle-to-Vehicle (V2V) connection and backhaul/fronthaul connection. In the micro network, THz wireless communication may be applied to near-field communication such as fixed point-to-point or multi-point connection such as wireless connection in indoor small cells, a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
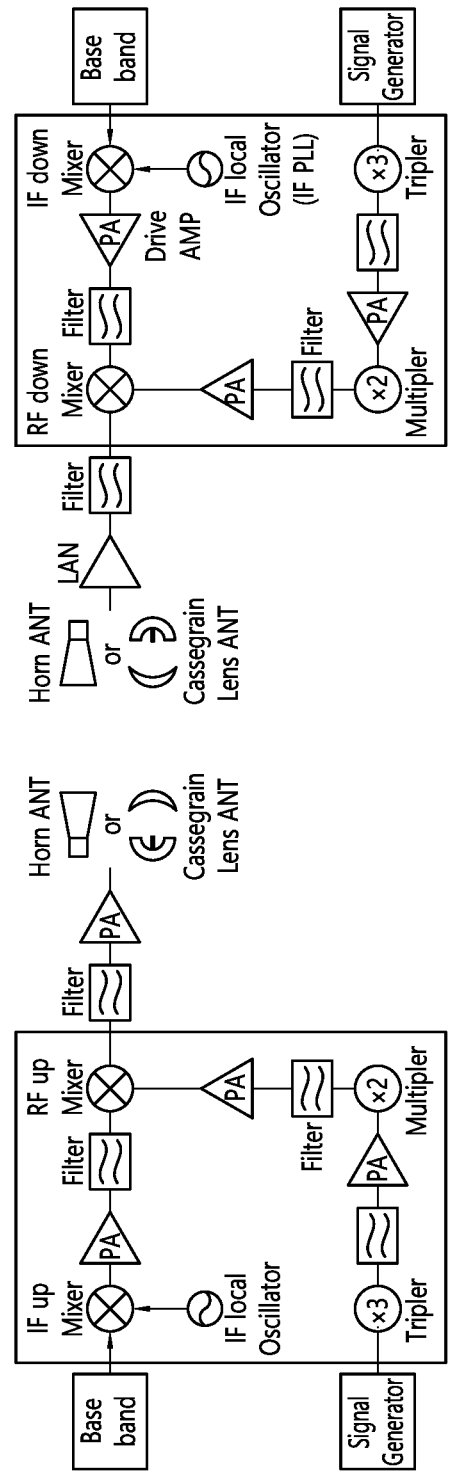
FIG. 18 is a diagram illustrating a THz wireless communication transceiver applicable to the present disclosure.

FIG. 18 is a diagram illustrating a THz wireless communication transceiver applicable to the present disclosure.

Referring to FIG. 18, THz wireless communication may be classified based on the method of generating and receiving THz. The THz generation method may be classified as an optical device-based or electronic device-based technology.

In this case, the method of generating THz using an electronic device includes a method using a semiconductor device such as a Resonance Tunneling Diode (RTD), a method using a local oscillator and a multiplier, a Monolithic Microwave Integrated Circuit (MMIC) method using a compound semiconductor High Electron Mobility Transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF refers an intermediate frequency, a tripler and a multiplier refers a multiplier, PA refers a power amplifier, LNA refers a low noise amplifier, and PLL refers a phase-locked loop.

Figure 19:
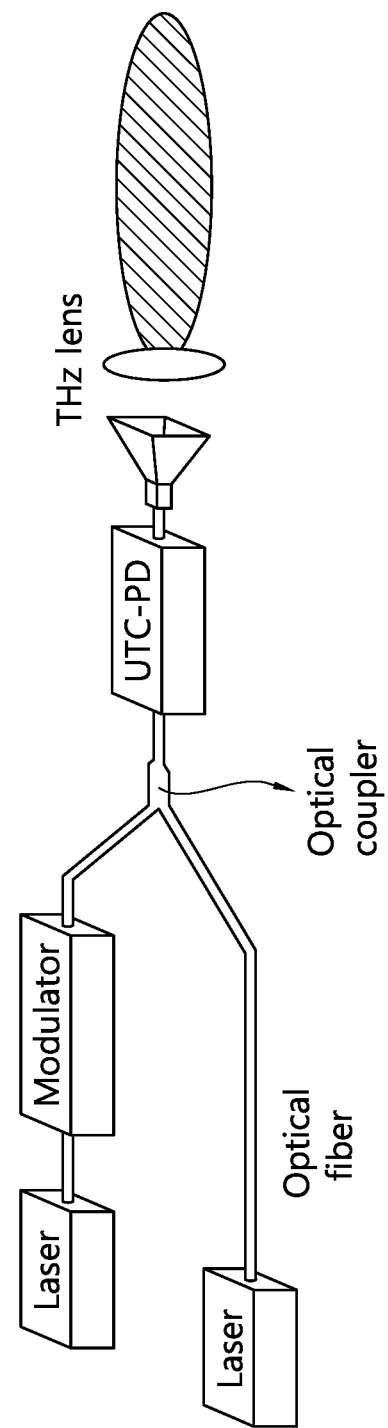
FIG. 19 is a diagram illustrating a THz signal generation method applicable to the present disclosure.
Figure 20:
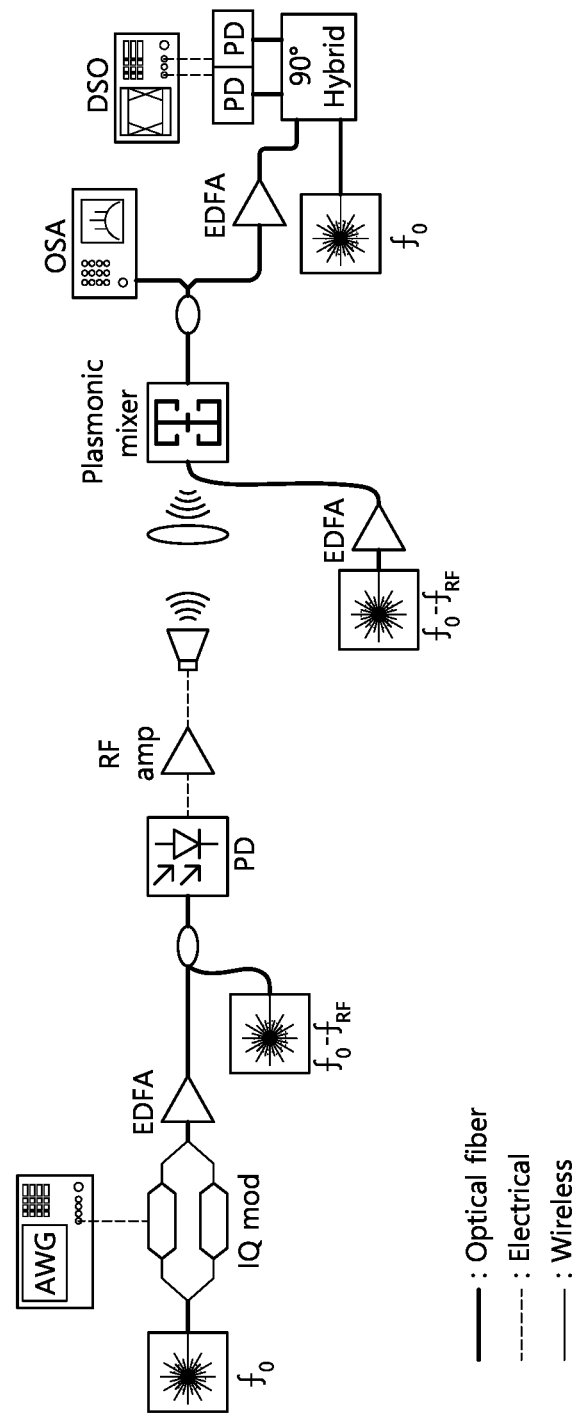
FIG. 20 is a diagram illustrating a wireless communication transceiver applicable to the present disclosure.

FIG. 19 is a diagram illustrating a THz signal generation method applicable to the present disclosure. FIG. 20 is a diagram illustrating a wireless communication transceiver applicable to the present disclosure.

Referring to FIGS. 19 and 20, the optical device-based THz wireless communication technology refers a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a Uni-Travelling Carrier Photo-Detector (UTC-PD) is one of photodetectors, which uses electrons as an active carrier and reduces the travel time of electrons by bandgap grading. The UTC-PD is capable of photodetection at 150 GHz or more. In FIG. 20, an Erbium-Doped Fiber Amplifier (EDFA) refers an optical fiber amplifier to which erbium is added, a Photo Detector (PD) refers a semiconductor device capable of converting an optical signal into an electrical signal, and OSA refers an optical sub assembly in which various optical communication functions (e.g., photoelectric conversion, electrophotic conversion, etc.) are modularized as one component, and DSO refers a digital storage oscilloscope.

Figure 21:
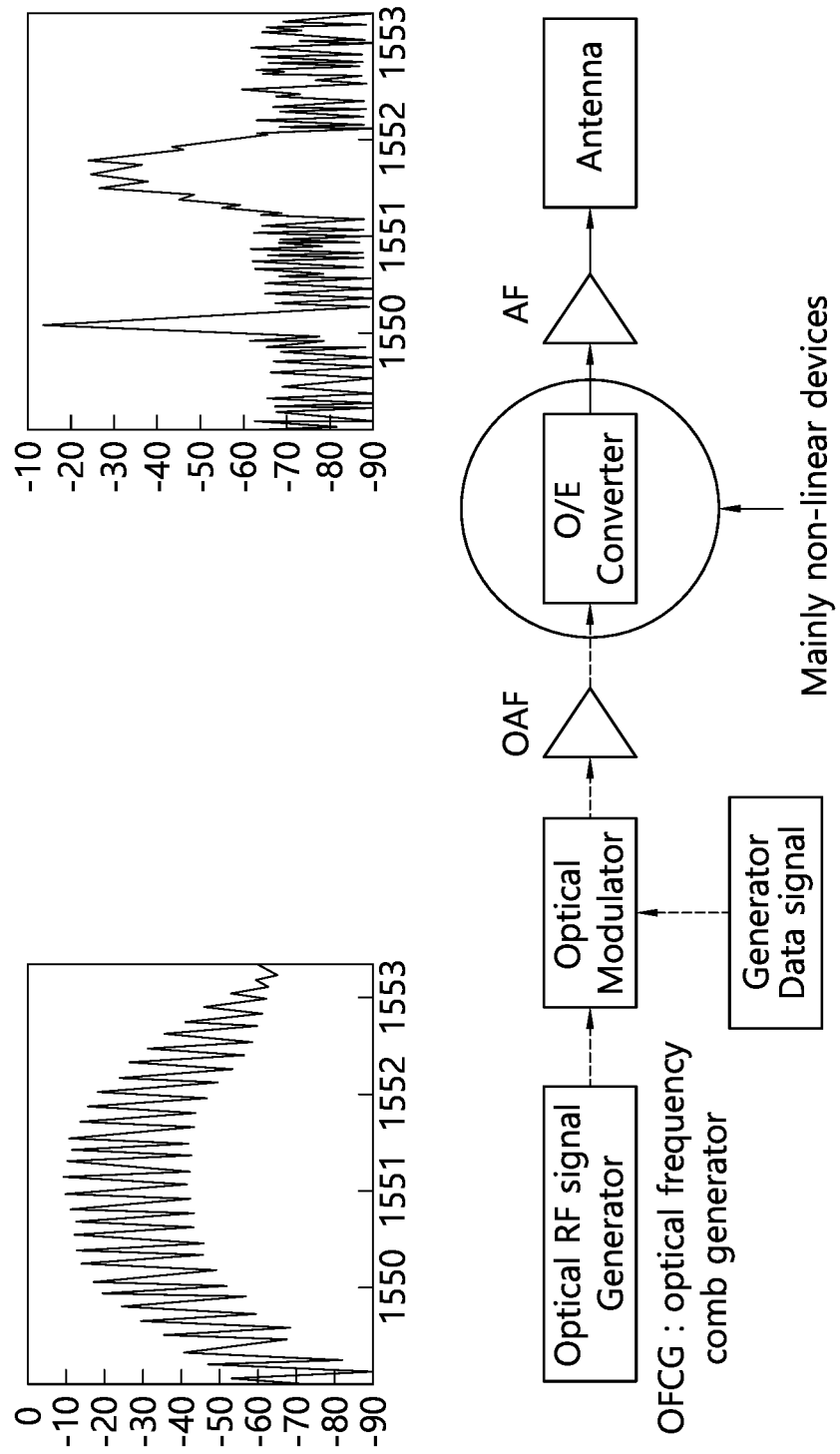
FIG. 21 is a diagram illustrating a transmitter structure applicable to the present disclosure.
Figure 22:
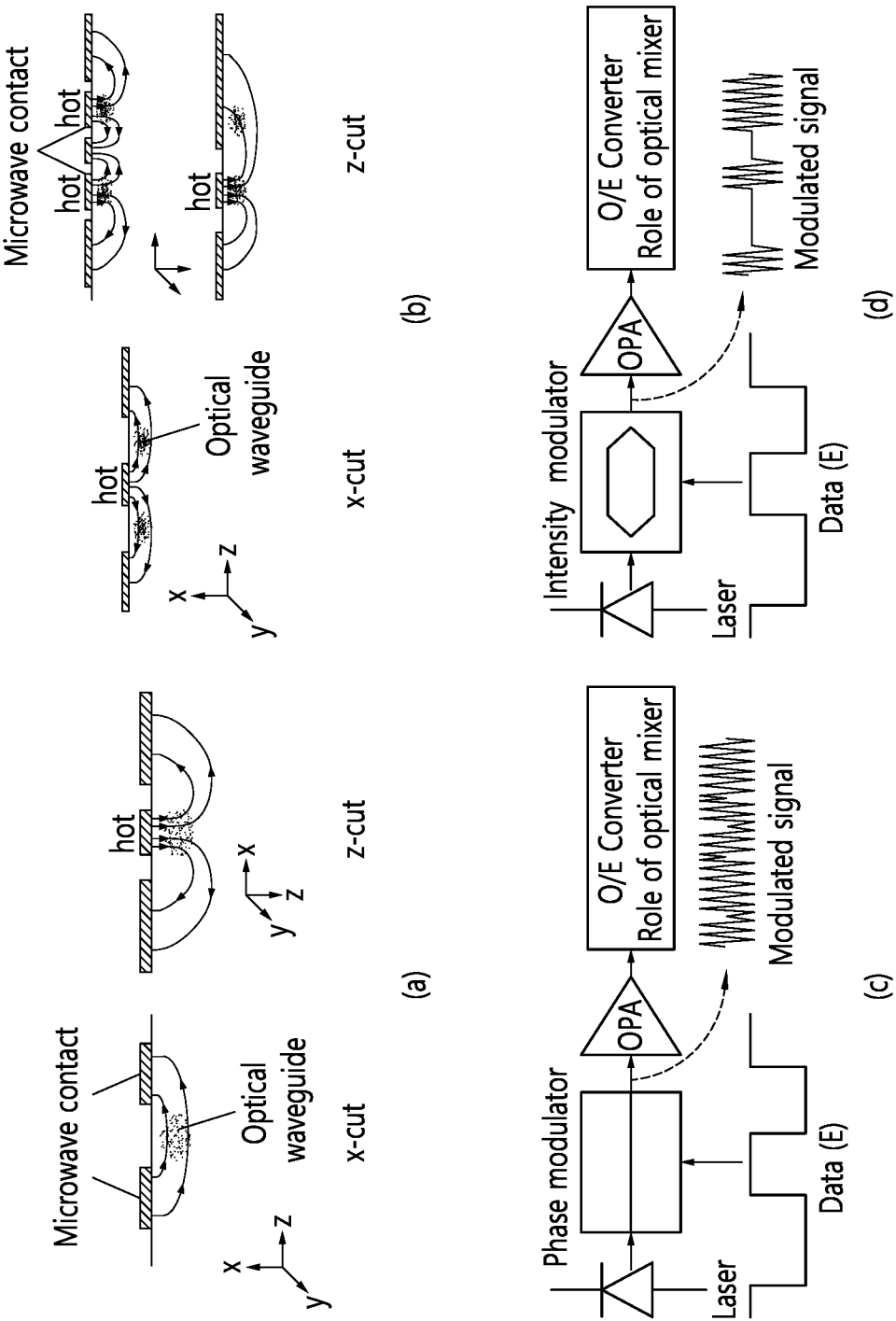
FIG. 22 is a diagram illustrating a modulator structure applicable to the present disclosure.

FIG. 21 is a diagram illustrating a transmitter structure applicable to the present disclosure. FIG. 22 is a diagram illustrating a modulator structure applicable to the present disclosure.

Referring to FIGS. 21 and 22, generally, the optical source of the laser may change the phase of a signal by passing through the optical wave guide. In this case, data is carried by changing electrical characteristics through microwave contact or the like. Thus, the optical modulator output is formed in the form of a modulated waveform. An O/E converter may generate THz pulses according to optical rectification operation by a nonlinear crystal, O/E conversion by a photoconductive antenna, and emission from a bunch of relativistic electrons, etc. The THz pulse generated in the above manner may have a length of a unit from femto seconds to pico seconds. The O/E converter performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^dB/km in the spectrum of up to 1 THz. Accordingly, a framework in which the available bandwidth is composed of several band chunks may be considered. As an example of the framework, if the length of the THz pulse for one carrier is set to 50 ps, the Bandwidth (BW) is about 20 GHz.

Effective down conversion from the infrared band to the terahertz band depends on how to utilize the nonlinearity of the O/E converter. That is, for down-conversion into a desired THz band, design of the O/E converter having the most ideal non-linearity to move to the corresponding THz band is required. If the O/E converter which is not suitable for a target frequency band is used, there is a high possibility that an error occurs with respect to the amplitude and phase of the corresponding pulse.

In a single carrier system, a terahertz transmission/reception system may be implemented using one O/E converter. In a multi-carrier system, as many O/E converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the O/E converter may be transmitted in a specific resource region (e.g., a specific frame). The frequency domain of the specific resource region may include a plurality of chunks. Each chunk may be composed of at least one Component Carrier (CC).

Hereinafter, proposals of the present disclosure are described.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

First, reinforcement learning is described below.

Figure 23:
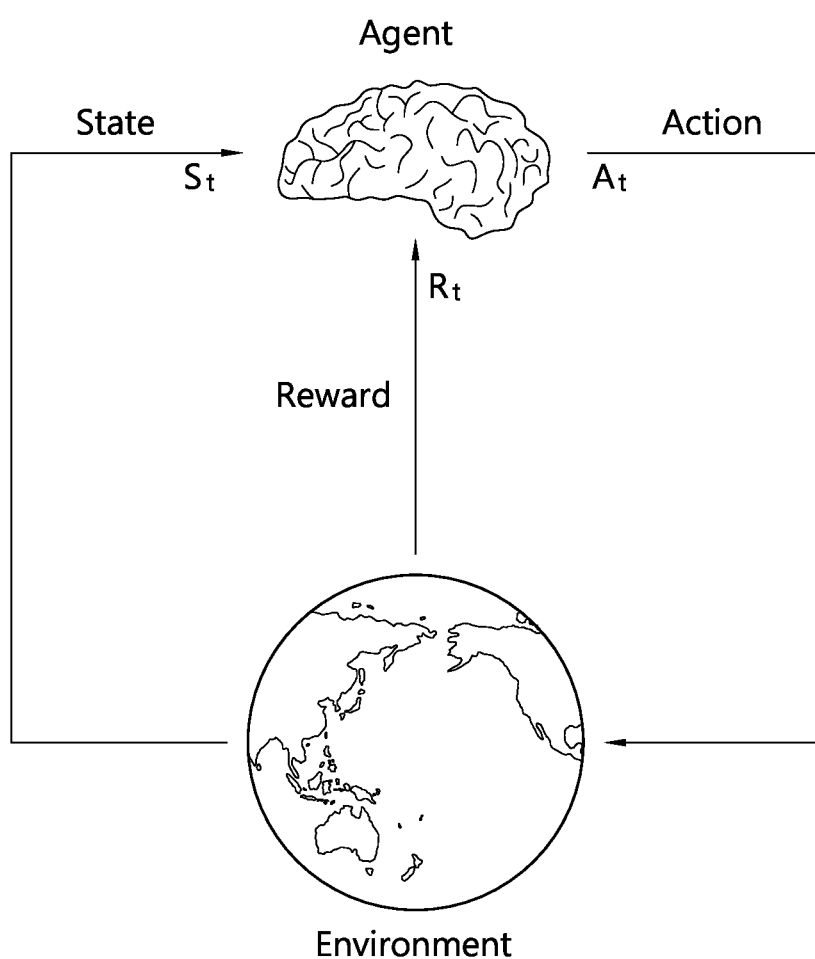
FIG. 23 illustrates reinforcement learning.

FIG. 23 illustrates reinforcement learning.

Reinforcement learning is a branch of machine learning, which is a method for a defined agent in an environment to recognize its current state and select an action or sequence of actions that maximizes its reward from a set of possible actions. While traditional machine learning requires large amounts of data to be fed into the system to learn, reinforcement learning does not require large amounts of data to be fed into the system because the AI learns by trial and error, so there is no training set of input-output pairs.

In reinforcement learning, an episode is a sequence (of states, actions, rewards) that an agent goes through from an initial state to a terminal state, and if the length of the episode is infinite or a very long problem, the end of the episode is unknown during the learning process. Therefore, it is desirable to apply online learning in reinforcement learning, where information is continuously processed and rewarded.

Figure 24:
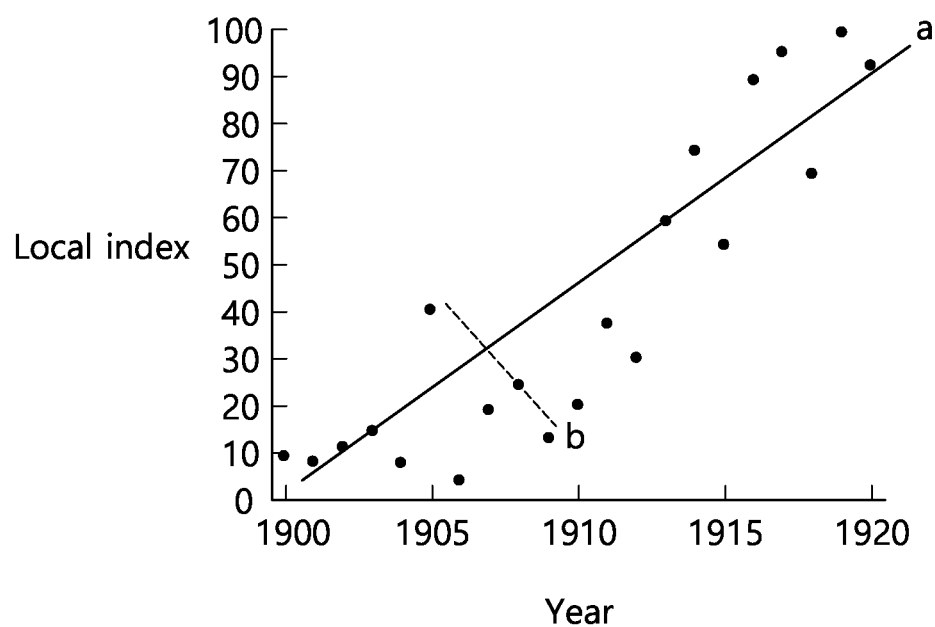
FIG. 24 illustrates an example of correlation of data in reinforcement learning.

FIG. 24 illustrates an example of correlation of data in reinforcement learning.

Each point in FIG. 24 represents data. As with machine learning, reinforcement learning attempts to reduce the co-relation of the data. In the case of supervised learning in machine learning, since the data and labels already exist, the data can be randomly sampled and trained to reduce the correlation of the data to find 'a' that is closer to the correct answer. However, in reinforcement learning, data comes in sequentially while interacting with the environment, so neighboring data, such as the straight line 'b', can be learned. To solve this problem, by training with a variety of data from different environments, the correlation of the data can be reduced and it may be ensured that it converges well on the goal.

Such reinforcement learning is being applied to the implementation of autonomous driving technologies, especially in areas that are difficult to model with conventional methods and difficult to learn sufficiently due to limitations in driving data acquisition. Situations such as intersections without traffic lights, unprotected left turns, right turns, ramp entries, etc., are very frequent in vehicle driving, but the number of variables such as vehicle speed, direction of travel, traffic volume, etc., varies greatly at each moment. By applying reinforcement learning in these situations, it is possible to implement the above process very effectively and with a high degree of perfection. By learning from hundreds of thousands or millions of iterations of a situation, reinforcement learning-based artificial intelligence is able to make different attempts in each situation. This kind of reinforcement learning-based autonomous driving research is being conducted at an advanced stage by various companies.

In a vehicle that performs autonomous driving based on reinforcement learning, numerous actions are performed before it starts and stops, and these actions are performed periodically and continuously. In order to learn from various data from the environment through actions, the system should be configured in such a way that the vehicle communicates its action to other vehicles and devices such as roadside units (RSUs) that can communicate with it, and learns by collecting the rewards it receives from interacting with the environment of the receiving devices. Consideration should be given to how to incorporate rewards into learning in applications such as autonomous driving that require periodic and continuous real-time behavioral reward updates.

Hereinafter, an Age of Information (AoI) is described. In the present disclosure, AoI is denoted by $\Delta(t)$.

AoI represents the time difference between data generation and consumption. If the most recently received packet at time t, i.e., the freshest packet received, is called U(t), then the AoI or age is the time elapsed from U(t) to the current time t, i.e., $\Delta(t)=t-U(t)$.

The AoI may be a mean of determining the freshness of information from a monitor's perspective. In particular, a small AoI indicates that there are new packets at the receiver.

Figure 25:
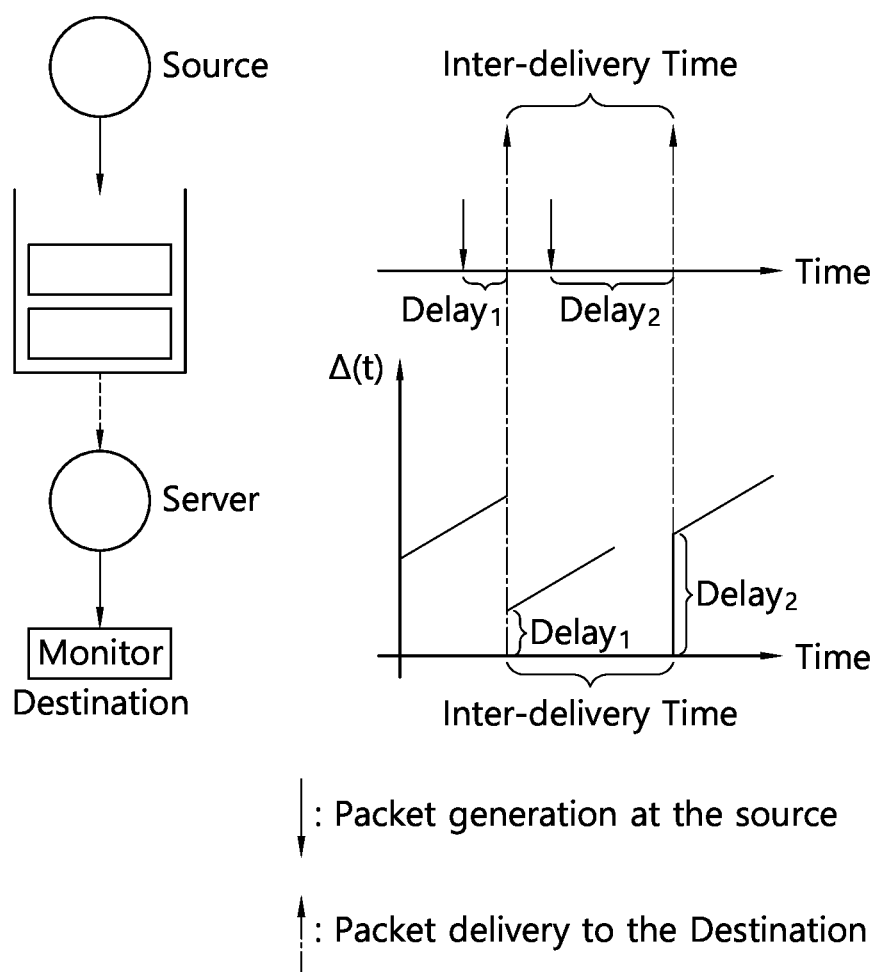
FIG. 25 illustrates an example of an AoI change.

FIG. 25 illustrates an example of an AoI change.

In FIG. 25, first delay ($Delay_1$) and second delay ($Delay_2$) refer to the time it takes for a packet to be transmitted and reach the receiver, respectively. Referring to FIG. 25, the AoI increases linearly until the packet is delivered, at which point the AoI decreases to the delay introduced by the packet. According to FIG. 25, the two parameters that affect AoI are the delay of the packet or message and the inter-delivery time. Controlling only one of these parameters may be difficult to increase AoI performance. The following table is an example of the numbers for an M/M/1 queue with a fixed service rate and a variable arrival rate. In Table 6, the service rate is 1 ($\mu=1$) and the arrival rate is denoted by $\lambda$.

TABLE 6

| | $\lambda$ (pkt/sec) | $\mathbb{E}$[delay] (sec) | $\mathbb{E}$[Inter - delivery] (sec) | Average AoI (Sec) |
|---|---|---|---|---|
| Case 1 | 0.01 | 1.01 | 100.00 | 101.00 |
| Case 2 | 0.53 | 2.13 | 1.89 | 3.48 |
| Case 3 | 0.99 | 100.00 | 1.01 | 100.02 |

Here, case 1 represents a queue which drives a high average AoI by high inter-delivery time, and case 3 represents a queue which drives a high average AoI by high packet delay. In addition, case 2 represents the system with the minimum average AoI. According to the table above, good AoI performance can be achieved when packets with low latency are transmitted periodically.

One way to keep the state of the information up to date, i.e., fresh, at the receiver is to minimize the average AoI. However, this may be mathematically intractable depending on the application used. To this end, Peak Age of Information (PAoI), which checks the maximum value of AoI just before the information is received, may be utilized in applications that need to detect the worst possible age or enforce a threshold value limit on age.

The age penalty function $g(\Delta)$, a function that models the level of frustration due to staleness of information or the need for new information, may be used to measure age by modifying the definition of AoI to a non-linear function. The above function may be configured differently depending on the application to be used, and based on this, the increase or decrease of AoI may be checked.

Figure 26:
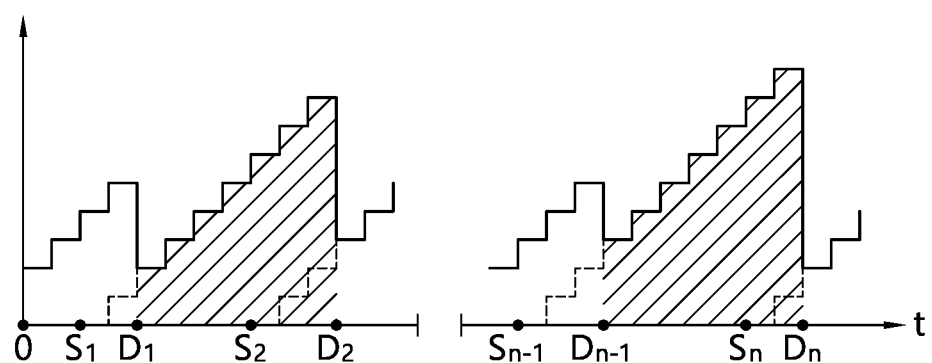
FIG. 26 illustrates an example of an age measured based on an age penalty function.

FIG. 26 illustrates an example of an age measured based on an age penalty function.

The age penalty function in FIG. 26 is a floor function applied to the AoI, which may be expressed as $g(\Delta)$=floor ($\Delta(t)$). Based on the age penalty function in FIG. 26, the age of the information obtained from the applications used may be measured.

In situations where information about the environment is communicated in real-time such as autonomous driving, more recent data is more important than older data. In order to quantify the timeliness of data or freshness of information delivered to the destination from the source, e.g., an RSU or other UE, a suitable criterion other than latency and throughput is needed, and one that takes into account the latency due to packet loss and the queueing/buffer latency at the source should be selected. From this point of view, it is desirable to organize the system using Age of Information (AoI), a performance metric to evaluate the freshness of the information received at the destination.

In an autonomous driving system using reinforcement learning, the computational speed of the devices in the group comprising the V2X communication and the radio environment between the agent and the devices may vary, resulting in different times for the rewards to reach the agent. In sequential reinforcement learning, the reward for an action is used to configure the next action, and the reward that arrives later is a reward for the action performed in the previous step, not the current action. Therefore, rather than taking a simple average sum of the rewards for previous actions, it is necessary to reflect the rewards as a weighted sum by setting a ratio based on AoI.

Accordingly, hereinafter, in a situation where reinforcement learning is used to implement autonomous driving technology in an autonomous driving system, a method in which the autonomous vehicle delivers its action to nearby vehicles and RSUs, and reflects the ratio of rewards by measuring the AoI of each reward by collecting the rewards in order to reflect them in online learning is proposed.

An autonomous driving system addressed herein may comprise vehicles and RSUs equipped with reinforcement learning related to autonomous driving techniques. The state and action for the reinforcement learning performed may be configured as follows. The state may be represented as a vector of pairs of the agent's current location and the location it wishes to go to in the future, and the action may be represented as a vector of velocities, which together represent direction and speed. These are examples of states and actions in reinforcement learning, and it is self-evident that they are not limited to the above examples.

Figure 27:
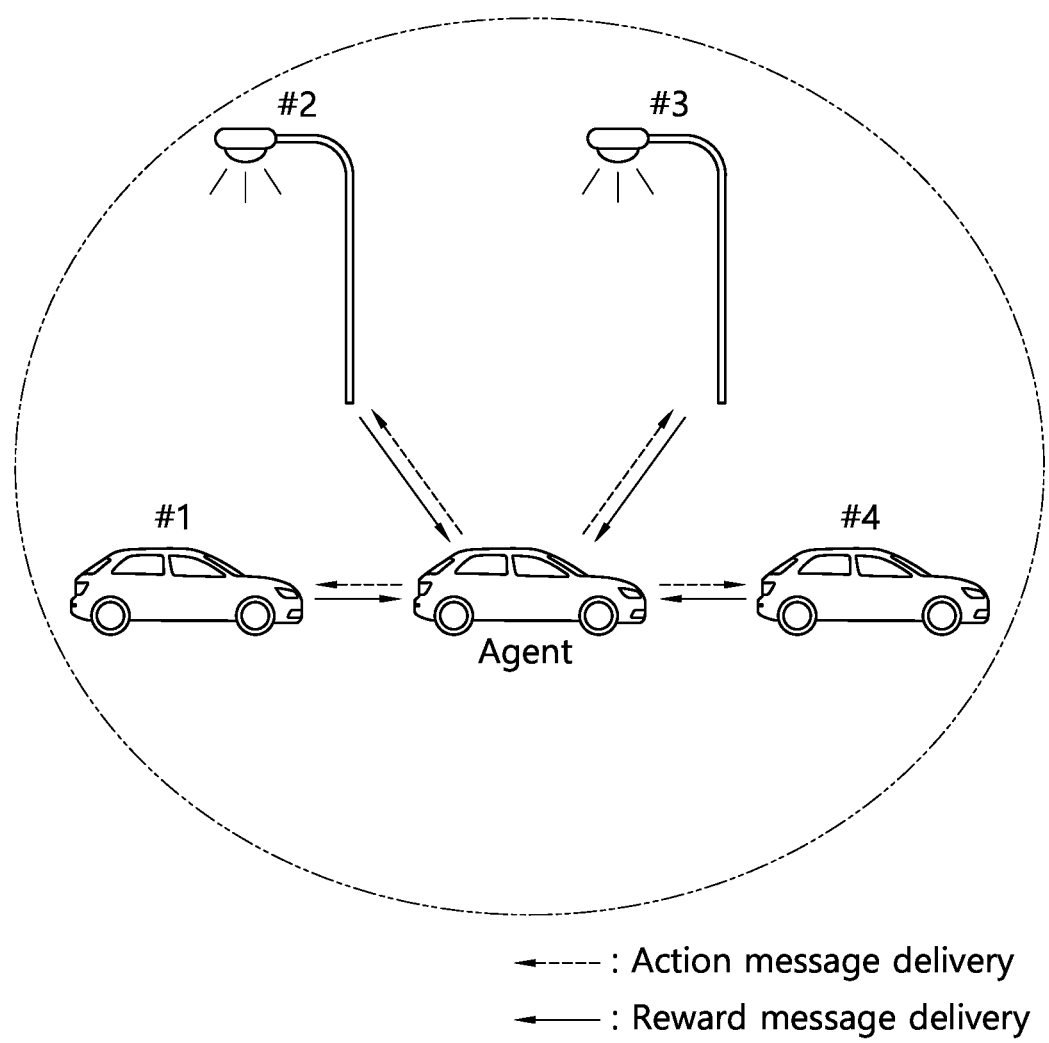
FIG. 27 illustrates an example of receiving multiple rewards for delivering an agent's action in a grouped environment.

FIG. 27 illustrates an example of receiving multiple rewards for delivering an agent's action in a grouped environment.

In a group of autonomous vehicles and RSUs that can communicate with each other, a vehicle that wishes to perform learning in a group becomes an agent and transmits its actions to the autonomous vehicles and RSUs that are communicating with it, and the vehicles and RSUs that receive the actions transmit rewards according to the environment to the agent vehicle. The agent vehicle checks the AoI which was measuring at the time it received the rewards, calculate the reward reflection ratio according to the AoI, and reflect it in learning.

Figure 28:
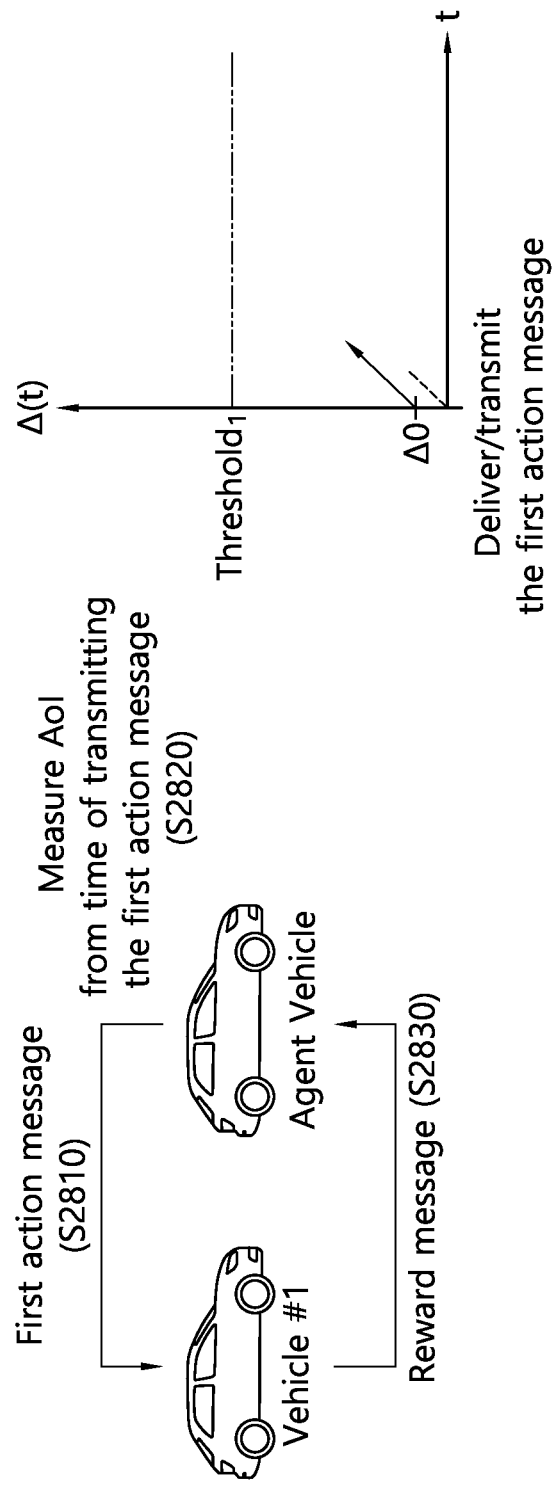
FIG. 28 illustrates an example of a learning process of an autonomous vehicle performing reinforcement learning.

FIG. 28 illustrates an example of a learning process of an autonomous vehicle performing reinforcement learning. The example of FIG. 28 illustrates the operation between the agent vehicle and vehicle #1 of FIG. 27.

Referring to FIG. 28, the agent vehicle transmits a first action message to vehicle #1 (S2810).

Further, the agent vehicle measures the AoI from the time of transmitting the first action message to vehicle #1 (S2820).

Then, vehicle #1 calculates a reward based on the first action message and transmits a reward message to the agent vehicle indicating the reward (S2830).

While FIG. 28 illustrates only the operation between the agent and vehicle #1, the message transmission operation of the agent may be performed simultaneously for other vehicles. In other words, the action message may be groupcast or broadcast.

In a general extension of the example of FIG. 28, a vehicle for learning in a group becomes an agent, performs an action, and then transmits an action message indicating the action performed to vehicles in communication within the group. The agent uses/calculates the AoI to calculate the percentage of reflection for the reward, and increments the AoI from the time the first action message is delivered. An age penalty function g(Δ) may be configured relating to the increase in AoI, which may be configured by the base station and transmitted to the UE, or may be configured by a device such as an agent. The graph of FIG. 28 illustrates an example of a linear increase in AoI in a situation where no age penalty function is configured. Upon receiving the action message, the vehicle or RSU calculates a reward for the action and transmits a reward message containing the reward to the agent. At the time the agent vehicle receives the reward message, the agent vehicle measures its AoI.

Figure 29:
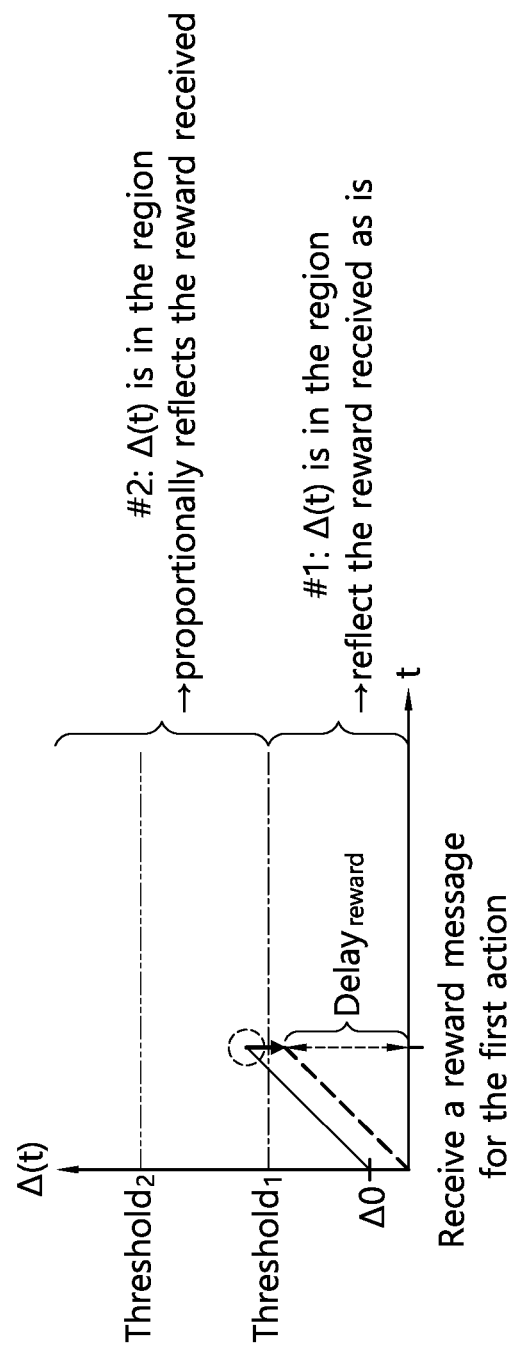
FIG. 29 illustrates measurement of AoI change and PAoI of a reward for an agent's first action.

FIG. 29 illustrates measurement of AoI change and PAoI of a reward for an agent's first action.

Referring to FIG. 29, the agent measures the change in AoI for the reward. Here, to simplify the calculation, the PAoI at the time of receiving the reward may be measured when calculating the AoI. If the PAoI is below the first threshold (Threshold$_1$), i.e., if the PAoI is within region #1 of FIG. 29, the agent may reflect the reward for the action as is and use it for learning. If the PAoI is greater than Threshold$_1$, i.e., if the PAoI exists in Area #2 of FIG. 29, the agent may only reflect a certain ratio of the reward for the action in its learning. The above reflection ratio P may be expressed as the following equation.

$$p = \frac{\text{Threshold}_2 - \text{Threshold}_1}{PAoI} \quad \text{[Equation 1]}$$

Here, PAoI may refer to the PAoI at the time of receiving the reward. Further, the second threshold (Threshold$_2$) may be determined by considering the maximum inter-delivery time required for the action message and the reward message to be delivered, the maximum delay required to calculate the reward for the delivered action, and the maximum delay required to reach the layer that calculates the AoI. For the first threshold and second threshold, they may be determined by the base station and transmitted to the devices, or they may be determined by the devices.

Figure 30:
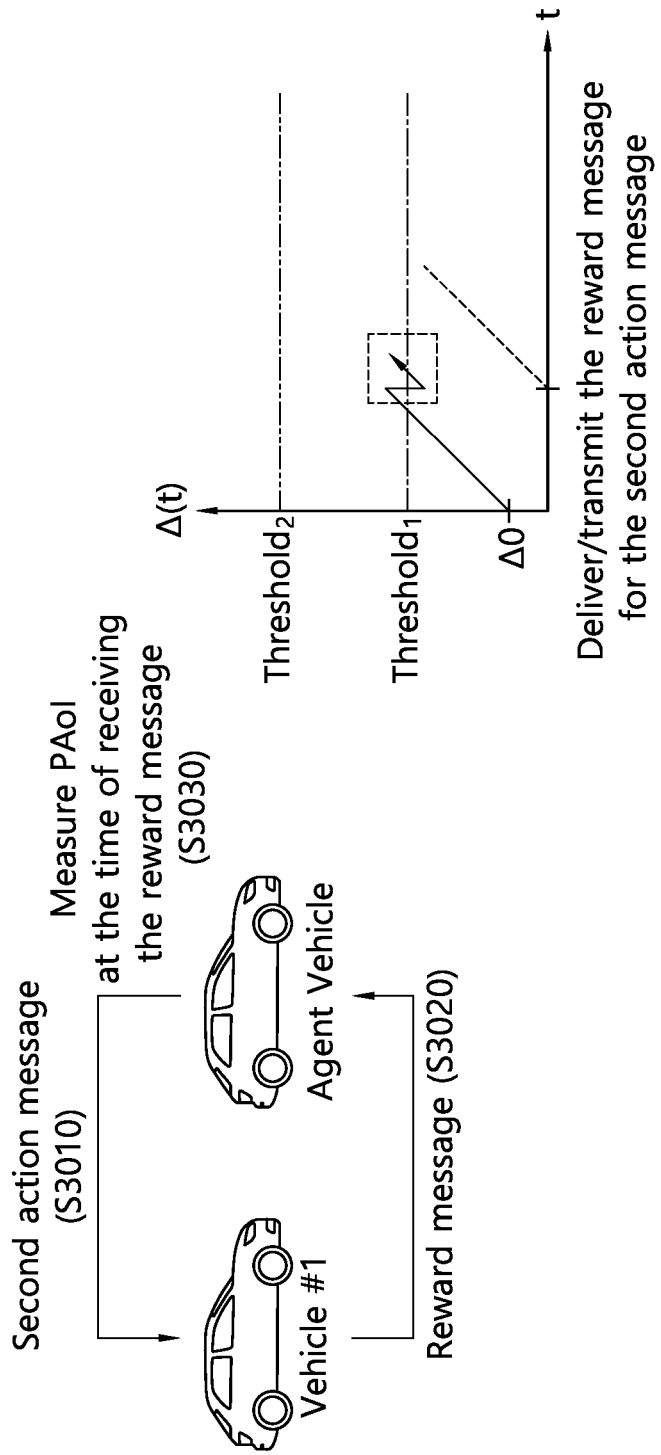
FIG. 30 illustrates an example of a learning process of an autonomous vehicle performing reinforcement learning.

FIG. 30 illustrates an example of a learning process of an autonomous vehicle performing reinforcement learning. Here, FIG. 30 may illustrate a situation after the situation described in FIG. 28.

Referring to FIG. 30, after receiving the reward message for the first action, the AoI continues to increase. The agent vehicle transmits a second action message to vehicle #1 (S3010).

Vehicle #1 then calculates a reward based on the second action message, and transmits a reward message to the agent vehicle indicating the reward (S3020).

The agent measures the PAoI at the time of receiving the reward message (S3030).

As with FIG. 28, FIG. 30 shows only the operation between the agent and vehicle #1, but the agent's message transmission operation may be performed simultaneously for other vehicles. In other words, the action message may be groupcast or broadcast.

That is, at the time the message about the reward is received, i.e., at step S2830 of FIG. 28, the age being measured is decreased by a time corresponding to the delay, and then the age continues to increase until another reward message is received. At the time the agent performs the new action, after the action message is delivered to the devices in the group, the PAoI may be measured at the time the reward message is received to determine the reflection ratio of the corresponding reward. After the reward is delivered to the application, the next action is performed, and this may happen repeatedly.

Figure 31:
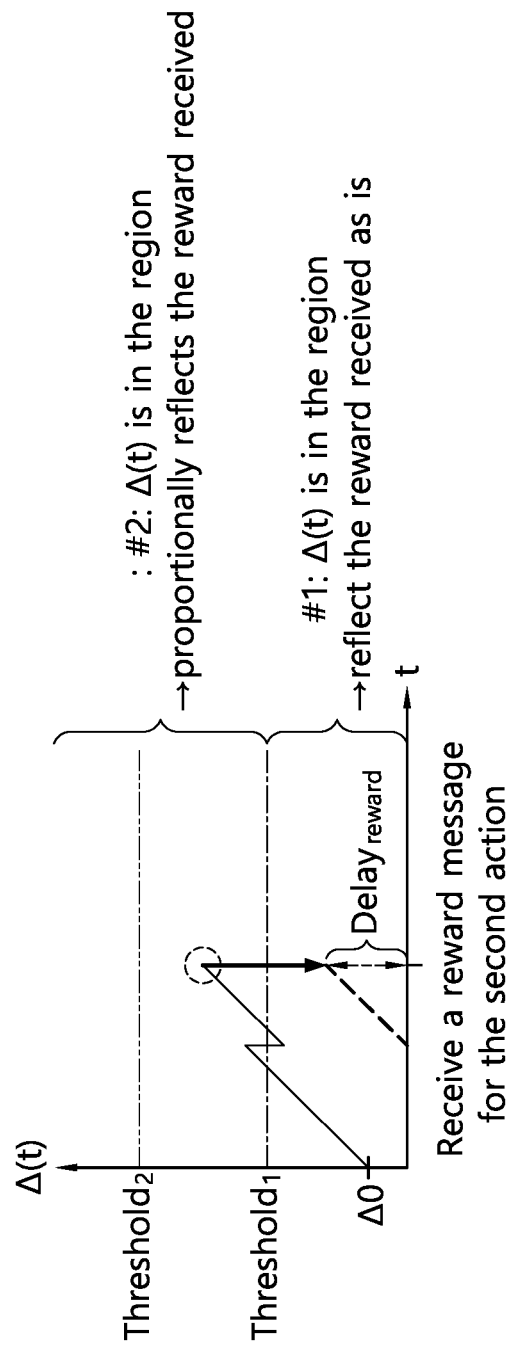
FIG. 31 illustrates an example of measurement of AoI change and PAoI of a reward for an agent's second action.
Figure 32:
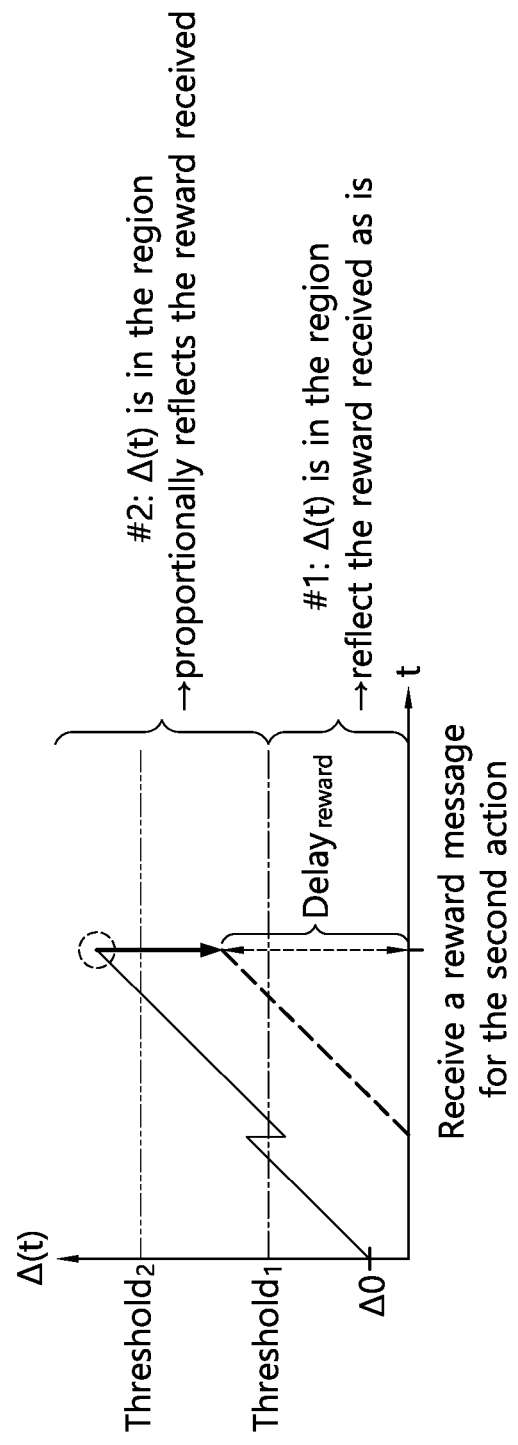
FIG. 32 illustrates an example of measurement of AoI change and PAoI of a reward for an agent's second action.

FIGS. 31 and 32 illustrate an example of measurement of AoI change and PAoI of a reward for an agent's second action.

Referring to FIG. 31, when measuring PAoI at the time the agent receives the reward message for the action, a value that reduces AoI by a time corresponding to the delay may be measured. In this case, if the value is less than the first threshold of FIG. 31, the reward contained in the received reward message may be reflected as it is, and if the value is greater than the first threshold and less than the second threshold, the reward may be reflected only by a certain ratio. Here, the ratio may be p as described above.

Meanwhile, it may occur that the PAoI has a value greater than the second threshold, such as in the example of FIG. 32. In such a case, in order to reduce the age value, when the agent transmits a message for the next action, it may include an indicator commanding/requesting the prompt delivery of a corresponding reward message. Upon receiving the action message, if the indicator is detected, the device may prioritize the transmission of the reward message that it is supposed to transmit. That is, the indicator may serve to increase the priority of the transmission.

Figure 33:
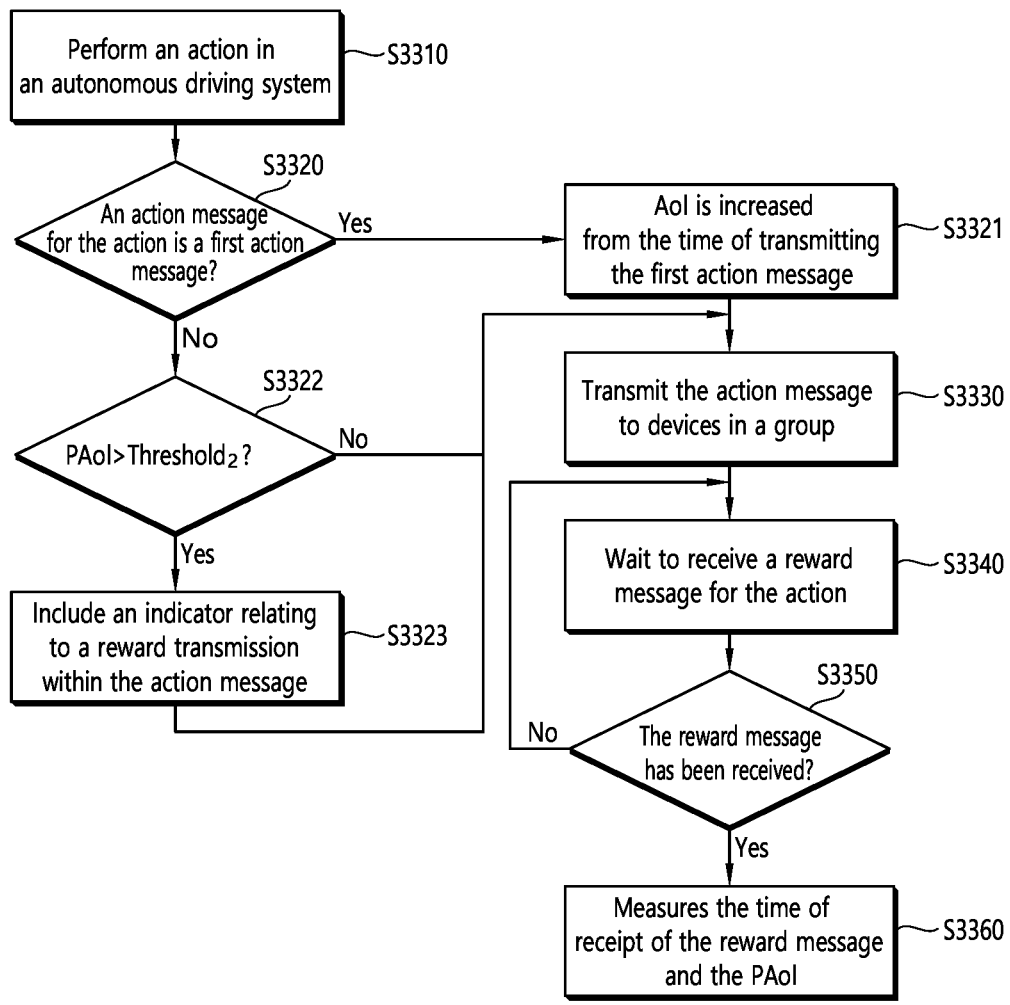
FIG. 33 is a flowchart of an example of operations of an agent/agent vehicle in a situation of exchanging actions/rewards for online learning in an autonomous driving system equipped with reinforcement learning, to which methods proposed in the present disclosure are applicable.
Figure 34:
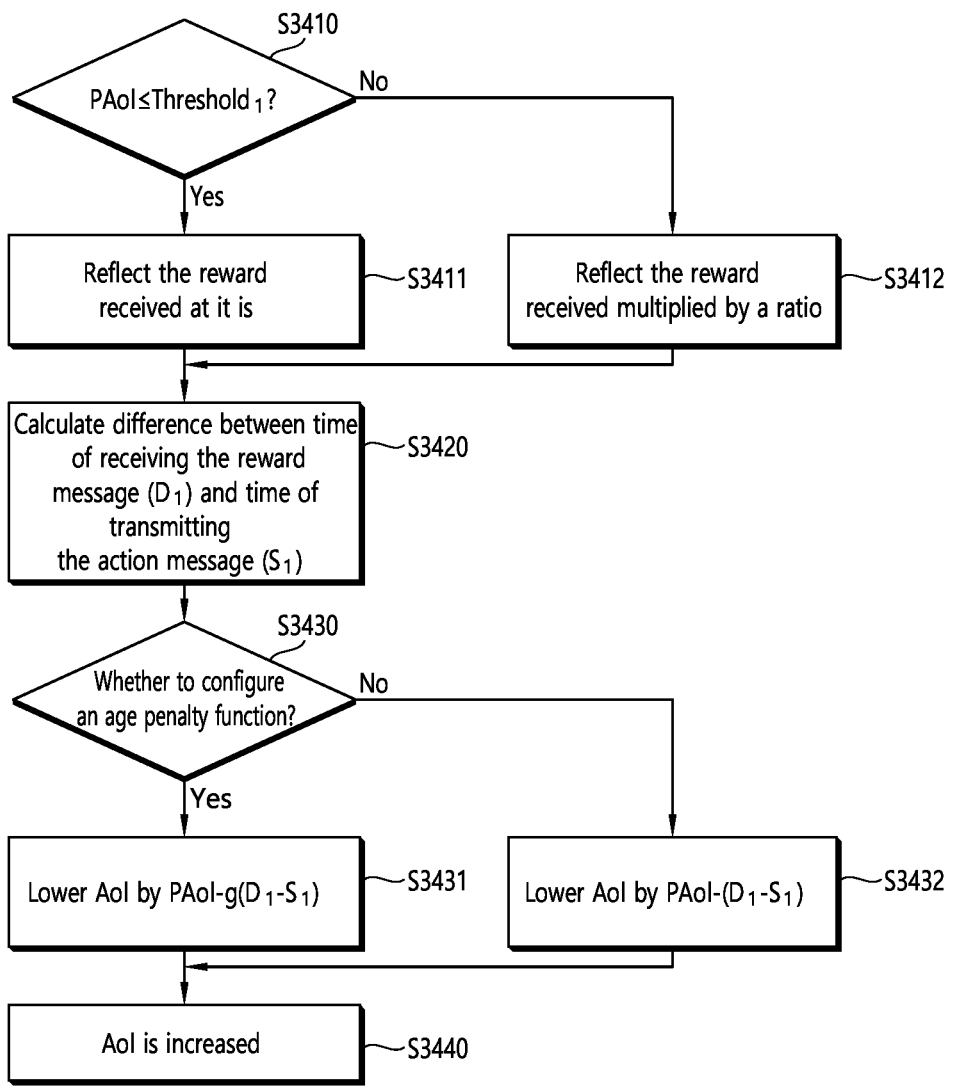
FIG. 34 is a flowchart of an example of operations of an agent/agent vehicle in a situation of exchanging actions/rewards for online learning in an autonomous driving system equipped with reinforcement learning, to which methods proposed in the present disclosure are applicable.

FIGS. 33 and 34 are flowcharts of an example of operations of an agent/agent vehicle in a situation of exchanging actions/rewards for online learning in an autonomous driving system equipped with reinforcement learning, to which methods proposed in the present disclosure are applicable. Here, the agent may be substituted for an autonomous vehicle, as well as various devices that comprise the autonomous communication. Each of the steps illustrated in FIGS. 33 and 34 may be omitted.

Referring to FIG. 33, the agent performs an action in the autonomous driving system (S3310).

The agent then determines whether the action message for the action is a first action message (S3320).

If the action message for the action is the first action message, the AoI is increased (S3321) from the time of transmitting the first action message. That is, the agent measures the AoI from the time of transmitting the action message for the action.

If the action message for the action is not the first action message, the agent determines whether the PAoI is greater than the second threshold (S3322). The PAoI in step S3322 may be the most recent PAoI measured by the agent. If the PAoI is greater than the second threshold, the agent includes, within the action message for the action, an indicator relating to a reward transmission (S3323). The indicator may be an indicator that requests or commands an expedited reward transmission for a device that receives an action message comprising the indicator, such as an indicator that commands an increased priority for such reward transmission.

The agent then transmits an action message for the action to the devices in the group (S3330). The agent then waits to receive a reward message corresponding to the action message for the action (S3340).

The agent determines whether the reward message has been received (S3350). If the agent has not received the reward message, the agent returns to step S3340. If the agent has received the reward message, the agent measures the time of receipt of the reward message and the PAoI (S3360).

Referring to FIG. 34, after the agent measures the time of receipt of the reward message and the PAoI, the agent determines whether the PAoI is below the first threshold (S3410). If the PAoI is below the first threshold, the agent applies the reward contained in the reward message (S3411). If the PAoI is greater than the first threshold, the agent reflects the reward contained in the reward message multiplied by a ratio (S3412). Here, the ratio may be calculated based on the above-mentioned equation 1.

After reflecting the reward, the agent calculates the difference between the time of receiving the reward message ($D_1$) and the time of transmitting the action message (Si) (S3420).

Thereafter, the agent determines whether to configure an age penalty function ($g(\Delta)$) (S3430). If the age penalty function is configured for the agent, the agent lowers the AoI by PAoI-$g(D_1$-Si) (S3431). If the age penalty function is not configured for the agent, the agent lowers its AoI by PAoI-($D_1$-Si) (S3432). Thereafter, the AoI is increased over time (S3440).

After step S3440, the agent may perform the actions associated with S3310 of FIG. 33 if there are further actions to be performed, otherwise, all procedures and associated reinforcement learning may be terminated.

FIG. 35 illustrates an example of a method for generating action messages.

To deliver actions performed in an application where reinforcement learning is performed, a message containing action information may be generated and forwarded to lower layers, and at each layer, whether to include action information in the header information may be configured as control information. Finally, the MAC layer checks whether to request the transmission of a fast reward message and, if necessary, inserts an indicator into the MAC header or MAC Control Element (CE). Finally, a MAC Protocol Data Unit (PDU) containing the action information may be generated and then forwarded to the physical layer, which can deliver the action message to the devices in the group.

Figure 36:
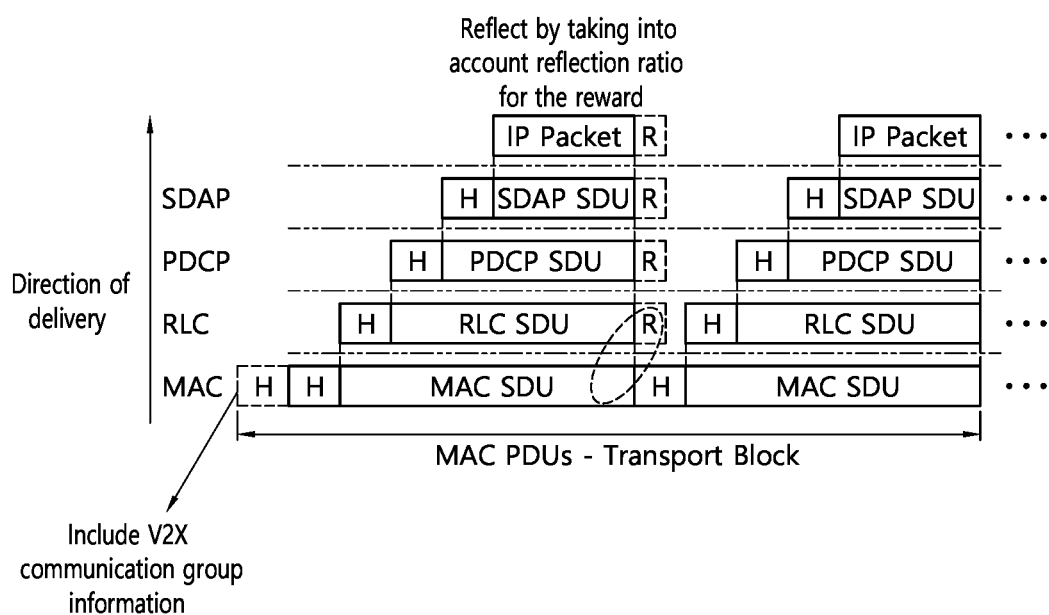
FIG. 36 illustrates an example of a method for receiving a reward message and applying a reward application ratio.

FIG. 36 illustrates an example of a method for receiving a reward message and applying a reward application ratio.

Referring to FIG. 36, when an agent receives a reward message, it transmits the reward application ratio according to the AoI measurement along with the reward. At the MAC layer, the header may be checked to determine that it is a Service Data Unit (SDU) containing a reward, and at that point, the PAoI of the reward message is measured to calculate the application rate of the reward. If the measured PAoI value is greater than the configured second threshold, the next action message transmission may be prepared to include/insert an indicator in the MAC header or MAC CE requesting faster transmission of the reward message. Once calculated, the reward application ratio may be transmitted to the upper layer, where it may be used for online learning of reinforcement learning reflecting the reward and the reward application ratio in the finally arriving application.

It will be appreciated that the examples of FIGS. 35 and 36 are examples of an agent's operations of transmitting and receiving action messages and reward messages, and are not limited to the above examples. Furthermore, the AoI calculation and the operation accordingly may be performed at layers other than the MAC layer.

Figure 37:
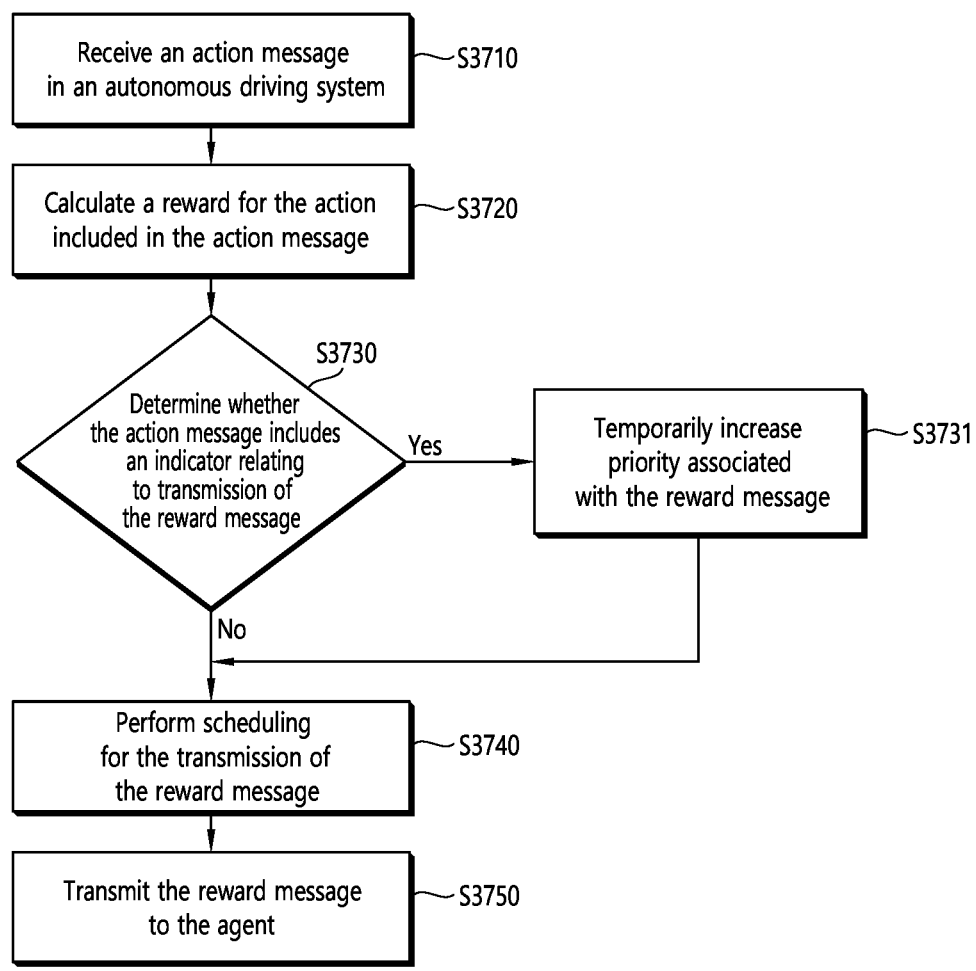
FIG. 37 is a flowchart illustrating operations of devices in a group operating in response to an agent transmitting an action message.

FIG. 37 is a flowchart illustrating operations of devices in a group operating in response to an agent transmitting an action message. Here, the devices may be not only autonomous vehicles, but also various devices that comprise communications related to autonomous driving, such as RSUs. Some of the steps in FIG. 37 may also be omitted.

Referring to FIG. 37, the device receives an action message from the agent (S3710).

The device then calculates a reward for the action included in the action message (S3720).

The device then determines whether the action message includes an indicator relating to transmission of the reward message (S3730). If the indicator is included, the device temporarily increases the priority associated with the reward message (S3731).

If the indicator is not included, or if the indicator is included and the priority is temporarily increased, the device performs scheduling for the transmission of the reward message (S3740).

Thereafter, the device transmits a reward message to the agent based on the scheduling (S3750).

Figure 38:
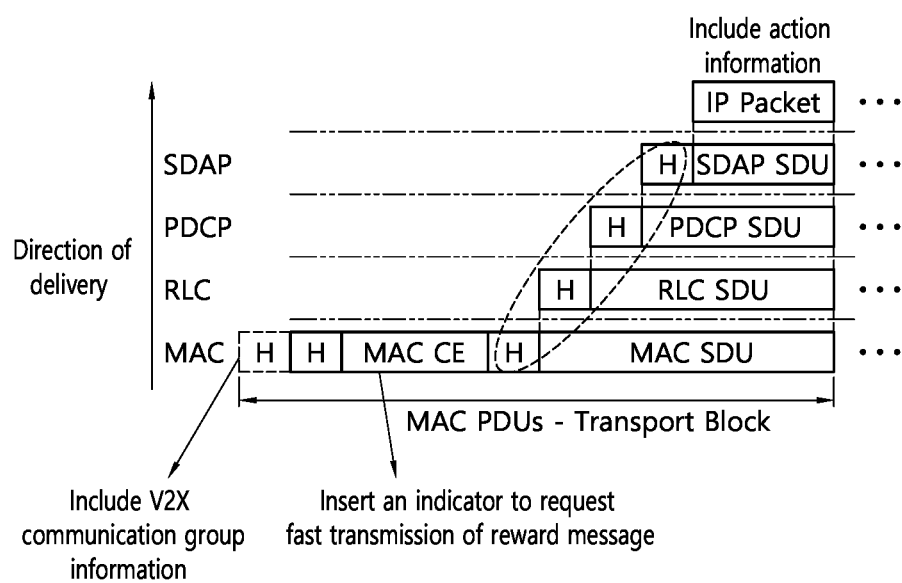
FIG. 38 illustrates operations of devices in a group operating in response to an agent transmitting an action message.

FIG. 38 illustrates operations of devices in a group operating in response to an agent transmitting an action message.

Referring to FIG. 38, it is first checked whether the transmission is from the same group, and then checked whether it is a request to transmit a fast reward message, i.e., a message containing an indicator. The V2X communication group information may be included in the MAC header. If the request is included, when a reward message is transmitted, it is scheduled to be prioritized for inclusion. The action message is then delivered in turn up to the application layer, which checks the headers contained within the received transport block to perform the reward calculation for the action.

Figure 39:
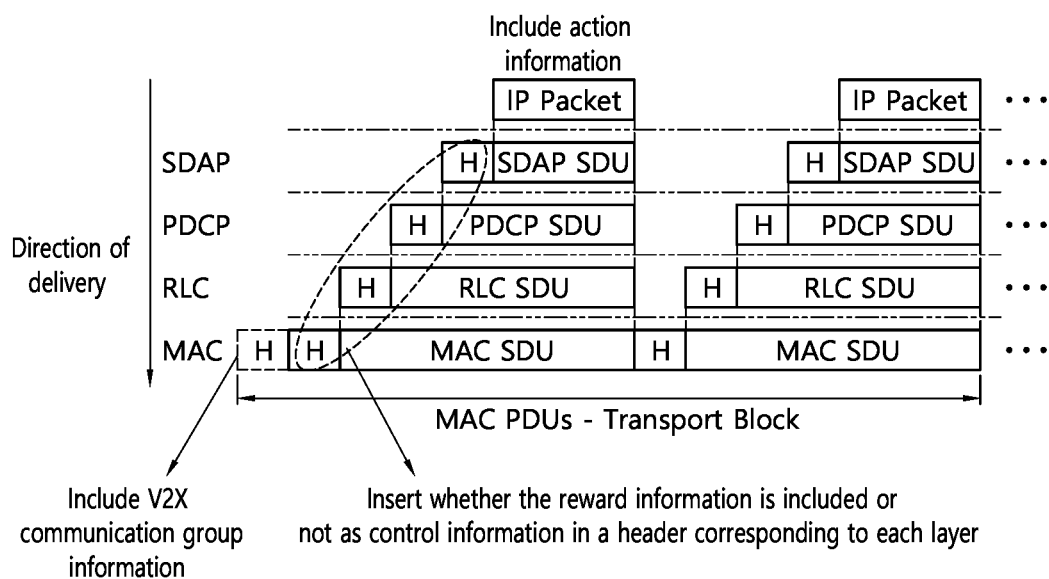
FIG. 39 illustrates operations of a device for transmitting a reward message.

FIG. 39 illustrates operations of a device for transmitting a reward message. An example of FIG. 39 may relate to operations related to transmitting a reward message in response to the action message received from the agent in FIG. 37.

Referring to FIG. 39, whether reward information is included in the reward message may be indicated in the header of each layer and delivered to lower layers. V2X communication group information may be included in the MAC header. Whether the reward information is included may be inserted as control information in the header corresponding to each layer. If a request is received from an agent to transmit a fast reward message (i.e., a message containing an indicator), the reward message is configured so that the MAC SDU containing the reward information is prioritized for inclusion by temporarily increasing its priority when scheduling to fit in the size of the transport block. Finally, the generated MAC PDUs may be transmitted to the physical layer to transmit the reward message to the agent.

It will be appreciated that FIGS. 38 and 39 are examples of operations related to transmitting and receiving action messages and reward messages from devices about the action of agents in a group, and are not limited to those examples.

Figure 40:
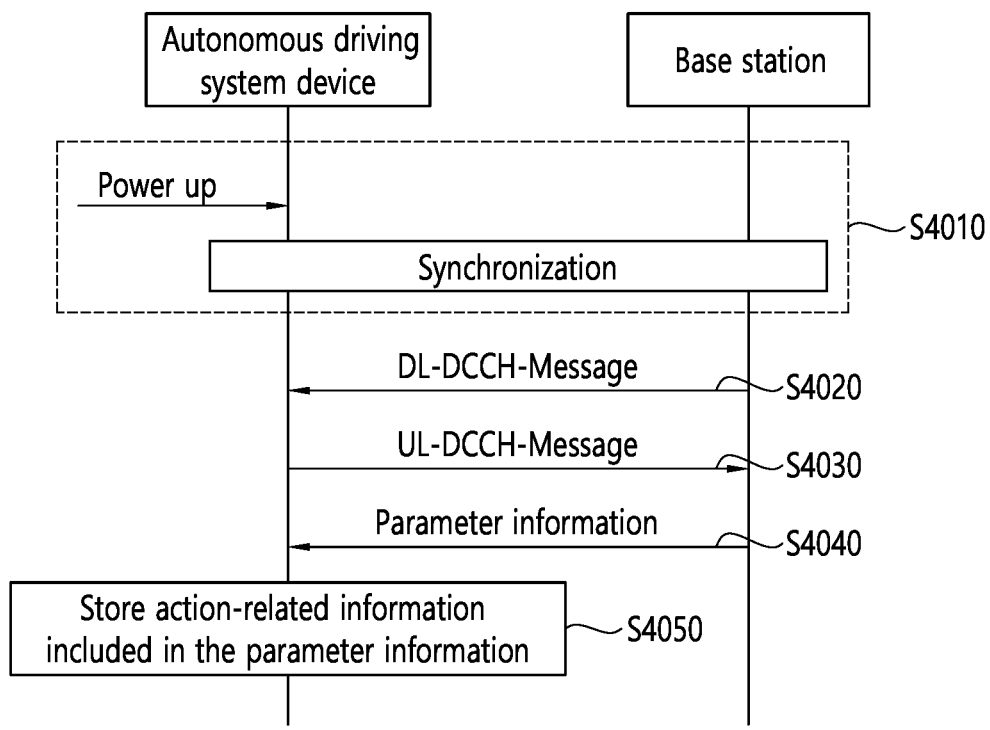
FIG. 40 illustrates an example of a learning-related parameter transmission procedure in a reinforcement learning-based autonomous driving system.

FIG. 40 illustrates an example of a learning-related parameter transmission procedure in a reinforcement learning-based autonomous driving system. FIG. 40 is an example of operations related to configuring reinforcement learning-related parameters between an autonomous driving system device and a base station, and it is self-evident that the example is not limited to such operations.

Referring to FIG. 40, when power is applied to the autonomous driving system device, the autonomous driving system device performs synchronization with the base station (S4010).

Then, the autonomous driving system device receives a DL-DCCH-message from the base station (S4020). The DL-DCCH-message may include UE capability request information. The UE capability request information may be information requesting to transmit UE capability information about whether reinforcement learning can be performed, what kind of action to perform, etc.

Then, the autonomous driving system device transmits the UL-DCCH-message to the base station (S4030). The UL-DCCH-message may include UE capability information about whether reinforcement learning can be performed, the type of action to be performed, the computing power of the device, and the like.

In other words, the base station requests capability information from the autonomous driving system device performing V2X communication, and the autonomous driving system device transmits information related to reinforcement learning and information about the computational capabilities of the device, such as CPU, RAM, etc., to the base station.

If the autonomous driving system device is able to perform reinforcement learning based on the received information, the base station determines a first threshold, a second threshold, whether to use an age penalty function (g(Δ)), and the age penalty function to determine a reward reflection ratio, and transmits parameter information including related parameters to the autonomous driving system device via DCI, MAC CE, or RRC signaling (S4040). Thereafter, the autonomous driving system device stores the action-related information included in the parameter information (S4050), and configures the reinforcement learning-related action based on the information.

Figure 41:
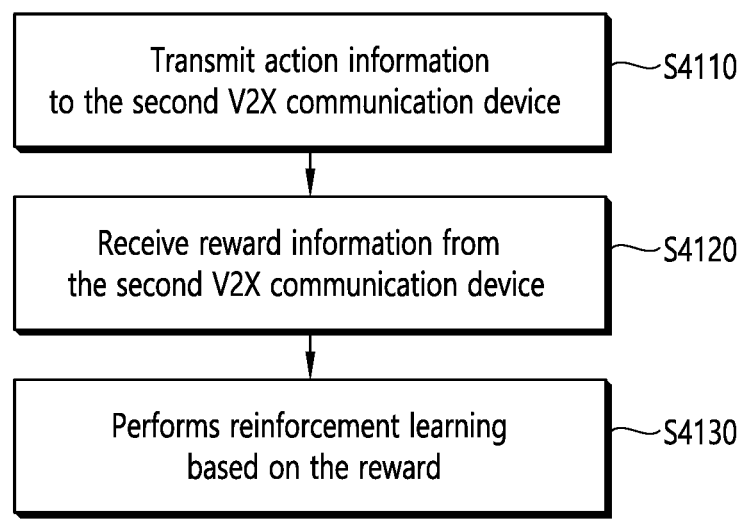
FIG. 41 is a flowchart of an example of a method of performing reinforcement learning of a first Vehicle-to-everything (V2X) communication device in an autonomous driving system according to some implementations of the present disclosure.

FIG. 41 is a flowchart of an example of a method of performing reinforcement learning of a first Vehicle-to-everything (V2X) communication device in an autonomous driving system according to some implementations of the present disclosure.

Referring to FIG. 41, the first V2X communication device transmits action information to the second V2X communication device (S4110). Here, the action information may indicate an action performed by the first V2X communication device.

Subsequently, the first V2X communication device receives reward information from the second V2X communication device (S4120). Here, the reward information may indicate a reward for the action.

Thereafter, the first V2X communication device performs reinforcement learning based on the reward (S4130). Here, the reinforcement learning may be applied with the reward at a ratio determined by the first V2X communication device.

Here, as described above, the ratio may be determined based on the equation 1. Specifically, the ratio may be determined based on the time from the time of transmission of the action information to the time of reception of the reward information, i.e., AoI/PAoI.

The claims set forth herein can be combined in a variety of ways. For example, the technical features of the method claims of the present disclosure may be combined to be implemented as a device, and the technical features of the device claims of the present disclosure may be combined to be implemented as a method. In addition, the technical features of the method claims of the present disclosure and the technical features of the device claims may be combined to be implemented as a device, and the technical features of the method claims of the present disclosure and the technical features of the device claims may be combined to be implemented as a method.

In addition to a UE/edge device, the methods proposed herein may also be performed by a device configured to control a UE, including at least one computer readable medium comprising instructions based on being executed by at least one processor, and at least one processor, and at least one memory operably connectable to the at least one processor and storing instructions, wherein the at least one processor executes the instructions to perform the methods proposed herein. Furthermore, it is self-evident that according to the methods proposed herein, actions by the base station/edge server corresponding to actions performed by the terminal/edge device may be considered.

What is claimed is:

1. A method of performing reinforcement learning performed by a first Vehicle-to-everything (V2X) communication device in an autonomous driving system, the method comprising:
   receiving a sidelink synchronization signal;
   performing a synchronization based on the sidelink synchronization signal;
   transmitting action information to a second V2X communication device, wherein the action information informs an action performed by the first V2X communication device;
   receiving reward information from the second V2X communication device, wherein the reward information informs a reward for the action; and
   performing reinforcement learning based on the reward, wherein the reinforcement learning is applied with the reward corresponding to a ratio determined by the first V2X communication device,
   wherein the ratio is determined based on a time from a time of transmission of the action information to a time of reception of the reward information,
   wherein the ratio is at least 0 and no more than 1.

2. The method of claim 1, wherein, based on the time from the time of transmission of the action information to the time of reception of the reward information being less than a first threshold, the ratio is 1.

3. The method of claim 1, wherein, based on the time from the time of transmission of the action information to the time of reception of the reward information being greater than a first threshold and less than a second threshold, the ratio is a value of a difference between the second threshold and the first threshold divided by the time from the time of transmission of the action information to the time of reception of the reward information.

4. The method of claim 3, wherein the first threshold and the second threshold are transmitted by a network to the first V2X communication device.

5. The method of claim 1, wherein, based on the time from the time of transmission of the action information to the time of reception of the reward information being greater than a second threshold, the first V2X communication device transmits a prioritized transmission request information to the second V2X communication device.

6. The method of claim 5, wherein the first V2X communication device performs a specific action based on the reinforcement learning, wherein the first V2X communication device transmits action information about the specific action to the second V2X communication device, and wherein the action information for the specific action includes the prioritized transmission request information.

7. The method of claim 6, wherein the prioritized transmission request information includes an indicator requesting prioritized transmission of reward information generated based on the action information for the specific action.

8. The method of claim 1, wherein the first V2X communication device receives capability request information from a base station, and wherein the first V2X communication device transmits capability information to the base station in response to the capability request information.

9. The method of claim 8, wherein the capability information includes information about at least one of a capability of the first V2X communication device to perform reinforcement learning, a type of actions of the first V2X communication device, and a computational capability of the first V2X communication device.

10. The method of claim 1, wherein the action information is groupcast or broadcast.

11. The method of claim 1, wherein the ratio is determined based on a maximum value of the time from the time of transmission of the action information to the time of reception of the reward information.

12. The method of claim 1, wherein the ratio is determined based on a value of a function applied to the time from the time of transmission of the action information to the time of reception of the reward information.

13. The method of claim 12, wherein the function is transmitted by a network to the first V2X communication device.

14. The method of claim 1, wherein the action is a vector for a direction of movement and a speed of movement of the first V2X communication device.

15. The first V2X communication device comprising:
one or more memories storing instructions;
one or more transceivers; and
one or more processors connecting the one or more memories and the one or more transceivers, wherein the one or more processors, by executing the instructions, perform, receiving a sidelink synchronization signal;
performing a synchronization based on the sidelink synchronization signal;
transmitting action information to a second V2X communication device, wherein the action information informs an action performed by the first V2X communication device;
receiving reward information from the second V2X communication device, wherein the reward information informs a reward for the action; and
performing reinforcement learning based on the reward,
wherein the reinforcement learning is applied with the reward corresponding to a ratio determined by the first V2X communication device,
wherein the ratio is determined based on a time from a time of transmission of the action information to a time of reception of the reward information,
wherein the ratio is at least 0 and no more than 1.

16. An apparatus configured to control a first V2X communication device in an autonomous driving system, wherein the apparatus comprising:
one or more processors; and
one or more memories operably connected by the one or more processors and storing instructions, wherein the one or more processors, by executing the instructions, perform,
receiving a sidelink synchronization signal;
performing a synchronization based on the sidelink synchronization signal;
transmitting action information to a second V2X communication device, wherein the action information informs an action performed by the first V2X communication device;
receiving reward information from the second V2X communication device, wherein the reward information informs a reward for the action; and
performing reinforcement learning based on the reward,
wherein the reinforcement learning is applied with the reward corresponding to a ratio determined by the first V2X communication device,
wherein the ratio is determined based on a time from a time of transmission of the action information to a time of reception of the reward information,
wherein the ratio is at least 0 and no more than 1.

* * * * *